United States Patent
Ovadia et al.

(10) Patent No.: US 11,589,264 B2
(45) Date of Patent: Feb. 21, 2023

(54) SYSTEM AND METHOD FOR LEVERAGING ACCESS CUSTOMER PREMISE EQUIPMENT (CPE) GATEWAY RESOURCES TO PROVIDE 5G EDGE COMPUTING SERVICES

(71) Applicant: Charter Communications Operating, LLC, St. Louis, MO (US)

(72) Inventors: Shlomo Ovadia, Denver, CO (US); Michael Kloberdans, Brighton, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 0 days.

(21) Appl. No.: 16/945,151

(22) Filed: Jul. 31, 2020

(65) Prior Publication Data
US 2022/0038954 A1    Feb. 3, 2022

(51) Int. Cl.
*H04W 28/10*    (2009.01)
*H04W 76/15*    (2018.01)
*H04W 84/12*    (2009.01)

(52) U.S. Cl.
CPC ........... *H04W 28/10* (2013.01); *H04W 76/15* (2018.02); *H04W 84/12* (2013.01)

(58) Field of Classification Search
CPC ...... H04W 28/10; H04W 76/15; H04W 84/12
See application file for complete search history.

(56) References Cited

U.S. PATENT DOCUMENTS

| | | | |
|---|---|---|---|
| 10,848,988 B1* | 11/2020 | Rahman | H04L 41/5025 |
| 10,917,328 B2* | 2/2021 | Jha | H04L 45/306 |
| 11,012,857 B1* | 5/2021 | Malhotra | H04W 8/08 |
| 2001/0053152 A1* | 12/2001 | Sala | H04N 21/6118 370/468 |
| 2012/0106346 A1* | 5/2012 | Aguirre | H04W 28/08 370/237 |
| 2015/0078359 A1* | 3/2015 | Scahill | H04W 12/08 370/338 |
| 2017/0295512 A1* | 10/2017 | Rangaswamy | H04W 28/0205 |
| 2018/0041905 A1* | 2/2018 | Ashrafi | H04W 48/18 |
| 2018/0150287 A1* | 5/2018 | Del Sordo | G06F 8/62 |
| 2018/0227219 A1* | 8/2018 | Zhang | H04L 45/22 |
| 2018/0270677 A1* | 9/2018 | Brisebois | H04W 48/20 |
| 2018/0288137 A1* | 10/2018 | Veeramani | G06F 9/5044 |

(Continued)

OTHER PUBLICATIONS

"5G Wireless Wireline Converged Core Architecture Technical Report";WR-TR-5WWC-ARCH-V01-190820 (Year: 2019).*

*Primary Examiner* — Parth Patel
(74) *Attorney, Agent, or Firm* — The Marbury Law Group, PLLC

(57) ABSTRACT

Systems and methods for operating a customer premise equipment (CPE) device with agile software stack integrated with OpenSync™ layer for command, control, and telemetry via the operator's cloud network. It includes the configuration of the CPE device to receive traffic from an access network in a first system on chip (SoC) of the CPE device, and to provide 5G edge computing services to a 5G NR user equipment (UE) device via a second SoC of the CPE device. The CPE device may also be configured to receive 5G New Radio (NR) mobile traffic, receive in-home Wi-Fi traffic, and use at least one service flow (or only one service flow) to support both the 5G NR mobile traffic and the in-home Wi-Fi traffic.

30 Claims, 13 Drawing Sheets

(56) References Cited

U.S. PATENT DOCUMENTS

| | | | |
|---|---|---|---|
| 2019/0058741 A1* | 2/2019 | Mufti | H04L 65/1073 |
| 2019/0150035 A1* | 5/2019 | Altman | H04W 28/08 |
| | | | 370/235 |
| 2019/0223252 A1* | 7/2019 | Zhou | H04W 76/12 |
| 2019/0230503 A1* | 7/2019 | Circosta | H04W 48/16 |
| 2019/0246302 A1* | 8/2019 | Park | H04W 24/10 |
| 2019/0274064 A1* | 9/2019 | Chapman | H04W 28/0289 |
| 2019/0281588 A1* | 9/2019 | Zhang | H04W 52/08 |
| 2019/0312815 A1* | 10/2019 | Altman | H04L 43/0876 |
| 2019/0342785 A1* | 11/2019 | Li | H04W 28/0263 |
| 2019/0342797 A1* | 11/2019 | Fu | H04W 36/22 |
| 2019/0380076 A1* | 12/2019 | Wang | H04W 24/08 |
| 2019/0394683 A1* | 12/2019 | Sillanpaa | H04W 36/14 |
| 2020/0163012 A1* | 5/2020 | Zhu | H04W 12/08 |
| 2020/0267596 A1* | 8/2020 | Sudarsan | H04W 28/0289 |
| 2020/0275499 A1* | 8/2020 | Novlan | H04B 7/15507 |
| 2020/0382852 A1* | 12/2020 | Rahman | H04L 41/40 |
| 2020/0396623 A1* | 12/2020 | Kakinada | H04W 24/04 |
| 2021/0051559 A1* | 2/2021 | Edge | H04W 4/029 |
| 2021/0076359 A1* | 3/2021 | Sosnin | H04L 5/0032 |
| 2021/0112616 A1* | 4/2021 | Karandikar | H04W 80/02 |
| 2021/0114616 A1* | 4/2021 | Altman | H04W 36/00837 |
| 2021/0116907 A1* | 4/2021 | Altman | B60W 30/16 |
| 2021/0120524 A1* | 4/2021 | Palle | H04W 76/28 |
| 2021/0127271 A1* | 4/2021 | Wu | H04W 28/0842 |
| 2021/0212168 A1* | 7/2021 | Yoden | H04W 84/12 |
| 2021/0219354 A1* | 7/2021 | Babbellapati | H04W 48/16 |
| 2021/0227625 A1* | 7/2021 | Wang | H04W 76/11 |
| 2021/0227628 A1* | 7/2021 | Sevindik | H04W 88/06 |
| 2021/0235325 A1* | 7/2021 | Desai | H04L 47/22 |
| 2021/0243635 A1* | 8/2021 | Yan | H04L 27/2613 |
| 2021/0243823 A1* | 8/2021 | Elcock | H04W 48/16 |
| 2021/0266798 A1* | 8/2021 | Jin | H04W 60/04 |
| 2021/0289445 A1* | 9/2021 | Muruganathan | H04W 52/242 |

* cited by examiner

SYSTEM AND METHOD FOR LEVERAGING ACCESS CUSTOMER PREMISE EQUIPMENT (CPE) GATEWAY RESOURCES TO PROVIDE 5G EDGE COMPUTING SERVICES

BACKGROUND

Many subscribers connect to the Internet via a customer premise equipment (CPE), which may include a residential gateway (RG) and modem that together provide network connectivity to a home or small office network. Traditionally, CPE devices have been inexpensive networking devices designed to provide connectivity to a small number of UE devices in a home or small office. However, more recently, it has become common for a single subscriber to employ multiple personal devices simultaneously (e.g., a smartphone, a tablet, a laptop computer, a smart watch, a gaming system, a smart TV, etc.). In addition, many homes and small business now include a plurality of smart and Internet of Things (IoT) devices that require network connectivity and employ machine-to-machine (M2M) communications. Each of these additional devices exchange information with other systems and devices without human interaction. Examples of such IoT, smart IoT, and smart devices (herein collectively "smart-devices") include, but are not limited to, medical devices such as blood pressure monitor IoT, security cameras, gaming consoles, clocks, speakers, lights, door bells, cameras, thermostats, HVAC systems, personal hubs (e.g., Amazon Alexa/Echo®) and other similar "smart home" devices.

Due to the increasing number of smart-devices that require network connectivity, as well as other factors such as the vulnerability of these devices to malicious hacking, the rapid development new types of malware and cyber-attacks, as well as the private or sensitive nature of the data that is now being collected and communicated by the devices, etc., network service providers are increasingly implementing services and security solutions on more robust CPE devices. Consequently, more powerful Access CPE devices are emerging. These robust CPE devices may include an integrated voice gateway, powerful processors, packet offload engines, system-on-chips (SoCs), memories, antennas, power amplifiers, as well as other resources (e.g., power rails, etc.) that better support high-speed wireless communications and execute complex and power intensive applications.

Although these new and emerging Access CPE devices incredibly powerful, they are predominately used as a bridge for high-speed data to a downstream wireless router connected via LAN. As a result, many features of these powerful Access CPE devices remain underutilized.

5G new radio (NR) and other recently developed communication technologies allow wireless devices to communicate information at data rates (e.g., in terms of Gigabits per second, etc.) that are orders of magnitude greater than what was previously available. These communication networks are also more secure, more resilient to multipath fading, allow for lower network traffic latencies, and provide better communication efficiencies (e.g., in terms of bits per second per unit of bandwidth used, etc.). Improved solutions that leverage underutilized Access CPE gateway resources to provide new services, such as 5G edge computing services, in addition to the current Access CPE applications will be beneficial to consumers and internet service providers.

SUMMARY

The various aspects include methods of operating a customer premise equipment (CPE) device, which may include receiving in-home Wi-Fi traffic, receiving 5G New Radio (NR) mobile traffic, and using at least one service flow to support the 5G NR mobile traffic and the in-home Wi-Fi traffic. Some aspects may include using a software stack with 5G virtualized Radio Access Network (RAN) functionality to support 5G edge computing services. Some aspects may include using an OpenSync™ layer for command and control and telemetry via the service provider's cloud network.

Some aspects may include establishing a first connection between the CPE device and an access point component and establishing a second connection between the CPE device and a NR Access Network (NR-RAN) component, in which receiving the 5G New Radio mobile traffic includes receiving the 5G NR mobile traffic via the first connection. In some aspects, establishing the second connection between the CPE device and the NR-RAN component may include establishing an over-the-air connection between the CPE device and the NR-RAN component. In some aspects, using at least one service flow to support the 5G NR mobile traffic and the in-home Wi-Fi traffic may include using a single service flow to support both the 5G NR mobile traffic and the in-home Wi-Fi traffic.

Some aspects may include performing at least one or more of radio resource management mobility management, call control, session management, or identity management operations on the CPE device. Some aspects may include using one or more of a virtualized network function, a container, or a micro service to offload real time services from a component in a 5G core network to the CPE device. Some aspects may include receiving traffic from an access network in a first system on chip (SoC) of the CPE device, and providing a 5G edge computing service to a 5G NR user equipment (UE) device via a second SoC of the CPE device. In some aspects, receiving the traffic from the access network in the first SoC of the CPE device may include receiving the traffic from the access network in a lightweight processor of the of the CPE device, and providing the 5G edge computing service to the 5G NR UE device via the second SoC of the CPE device comprises providing the 5G edge computing service to the 5G NR UE device via a robust processor.

Further aspects may include a CPE device (e.g., a hybrid access CPE device, etc.) having a processor configured with processor-executable instructions to perform various operations corresponding to the methods discussed above. Further aspects may include a non-transitory processor-readable storage medium having stored thereon processor-executable instructions configured to cause a CPE device processor to perform various operations corresponding to the method operations discussed above. Further aspects may include a CPE device having various means for performing functions corresponding to the method operations discussed above.

BRIEF DESCRIPTION OF THE DRAWINGS

The accompanying drawings, which are incorporated herein and constitute part of this specification, illustrate exemplary embodiments, and together with the general description given above and the detailed description given below, serve to explain the features of various embodiments.

DETAILED DESCRIPTION

Figure 1A:
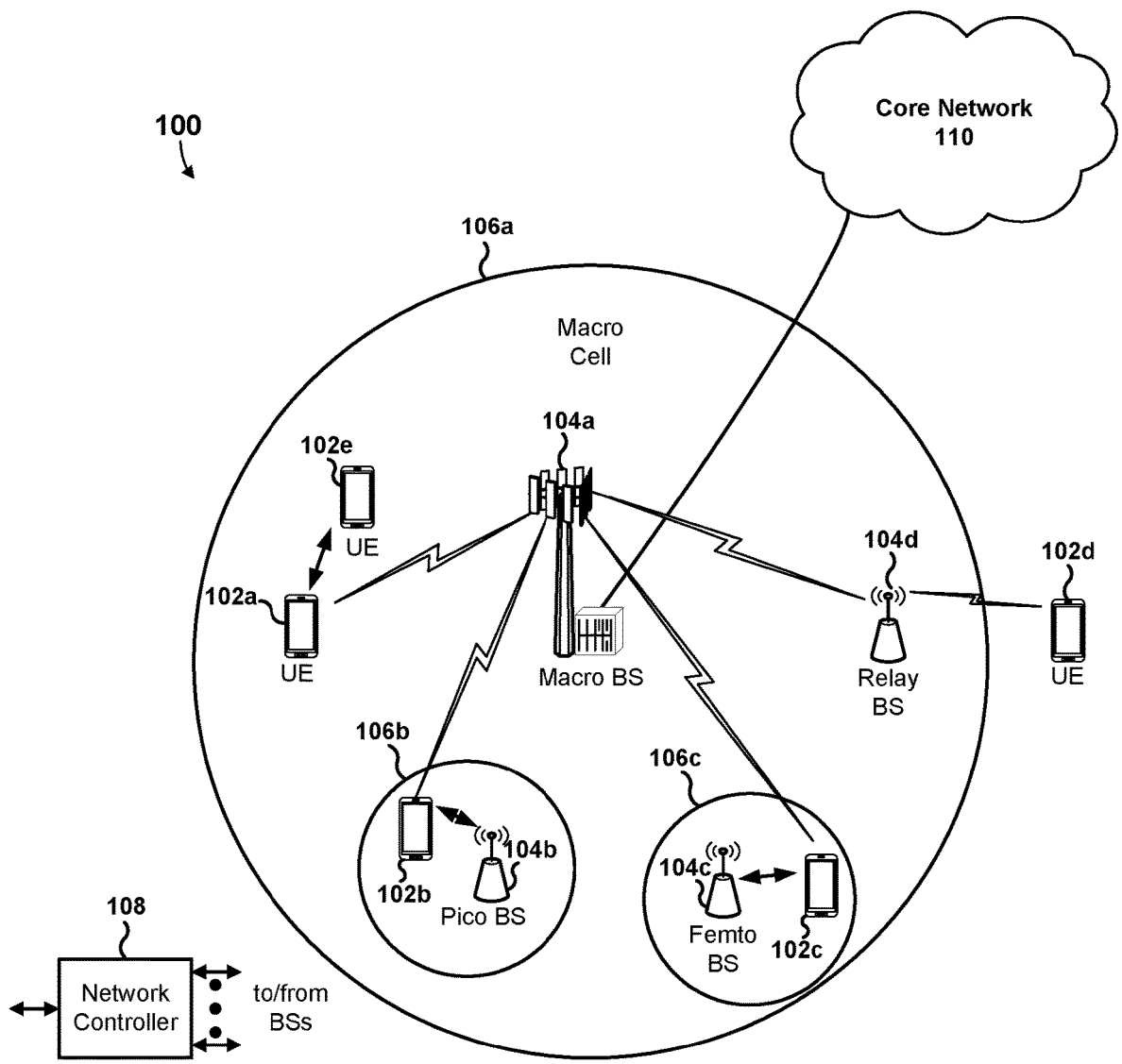
FIG. 1A is a system block diagram conceptually illustrating an example 5G communications system suitable for use by various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The term "service provider network" is used generically herein to refer to any network suitable for providing consumers with access to the Internet or IP services over broadband connections. Service provider networks may encompass both wired and wireless networks/technologies. Examples of wired network technologies and networks that may be included within a service provider network include cable networks, fiber optic networks, hybrid-fiber-cable networks, Ethernet, local area networks (LAN), metropolitan area networks (MAN), wide area networks (WAN), networks that implement the data over cable service interface specification (DOCSIS), networks that utilize asymmetric digital subscriber line (ADSL) technologies, etc. Examples of wireless network technologies and networks that may be included within a service provider network include third generation partnership project (3GPP), long term evolution (LTE) systems, third generation wireless mobile communication technology (3G), fourth generation wireless mobile communication technology (4G), fifth generation wireless mobile communication technology (5G), global system for mobile communications (GSM), universal mobile telecommunications system (UMTS), high-speed downlink packet access (HSDPA), 3GSM, general packet radio service (GPRS), code division multiple access (CDMA) systems (e.g., cdmaOne, CDMA2000™), enhanced data rates for GSM evolution (EDGE), advanced mobile phone system (AMPS), digital AMPS (IS-135/TDMA), evolution-data optimized (EV-DO), digital enhanced cordless telecommunications (DECT), Worldwide Interoperability for Microwave Access (WIMAX), wireless local area network (WLAN), Wi-Fi Protected Access I & II (WPA, WPA2), Bluetooth®, land mobile radio (LMR), and integrated digital enhanced network (iden). Each of these wired and wireless technologies involves, for example, the transmission and reception of data, signaling and/or content messages.

Any references to terminology and/or technical details related to an individual wired or wireless communications standard or technology are for illustrative purposes only, and not intended to limit the scope of the claims to a particular communication system or technology unless specifically recited in the claim language.

The term "user equipment (UE)" may be used herein to refer to any one or all of satellite or cable set top boxes, laptop computers, rack mounted computers, routers, cellular telephones, smart phones, personal or mobile multi-media players, personal data assistants (PDAs), customer-premises equipment (CPE), personal computers, tablet computers, smart books, palm-top computers, desk-top computers, wireless electronic mail receivers, multimedia Internet enabled cellular telephones, wireless gaming controllers, streaming media players (such as, ROKU™), smart televisions, digital video recorders (DVRs), modems, routers, network switches, residential gateways (RG), access nodes (AN), bridged residential gateway (BRG), fixed mobile convergence products, home networking adapters and Internet access gateways that enable consumers to access communications service providers' services and distribute them around their house via a local area network (LAN), and similar electronic devices which include a programmable processor and memory and circuitry for providing the functionality described herein.

The term "control plane" may be used in this application to refer to all the functions, processes, and signaling between network components to determine the path to the user data to use (i.e., routing protocols, etc.). Control plane data typically does not include actual user data. Examples of control plane data include information relating to communication setup, security, authentication, charging, enforcement of policy rules, modification, termination, etc.

The terms "interface" and "application programming interface (API)" may be used generically in this application to refer to any software interface that may be used by a first component to communicate with a second component. An interface may include specifications for routines, procedures, functions, methods, data structures, object classes, and variables.

The term "service flow" may be used in this application to refer to a unidirectional flow of packets that are guaranteed a particular bandwidth and a particular Quality of Service (QoS), which the service flow requested at the time that it was set-up. The Cable Modem Termination System (CMTS) ensures that sufficient resources are available to support the requested service flow before the CMTS can grant the cable modem the right to use the service flow. If the requested resources are available, the CMTS reserves the requested resources, and the service flow is activated. A service flow may exist in both the upstream and downstream direction, and may exist without actually being activated to carry traffic.

The term "network function virtualization (NFV)" may be used in this application to refer to components, systems and technologies that leverage virtualization techniques to enable existing network infrastructure (both user and control plane) to be consolidated and virtualized so that it may operate in a virtualized environment on commodity hardware.

The term "virtualized network function (VNF)" may be used in this application to refer a component, system, or network element that is configured to use virtualization techniques to implement a network function. For example, a VNF may be a software implementation of a network function that may be deployed on virtualized infrastructure (e.g., compute, storage, and network). A VNF may be included and used as part of a network function virtualization (NFV) solution.

The term "NFV Infrastructure (NFVI)" may be used in this application to refer to components, systems, network and/or computing infrastructures on which the network function virtualization (NFV) and/or virtualized network functions (VNFs) may be deployed and used. The NFVI may include physical server computing devices, hypervisors and controller.

The terms "network function virtualization orchestrator (NFVO)" and "network function virtualization manager (NFVM)" may be used in this application to refer to a component or system that is responsible for coordinating or managing network function virtualization (NFV) resources. For example, an NFVO may be responsible for deploying new virtualized network functions (VNFs) within a network function virtualization infrastructure (NFVI). The NFVO/NFVM may be configured to maintain a system wide view of the operations, functions and components, control all of the VNFs in the NFVI, and may be responsible for on-boarding new services, scaling, service lifecycle management, performance and policy management, etc.

The term "virtualized infrastructure manager (VIM)" may be used in this application to refer a component, system, or network element that is configured to control, manage, or monitor the NFVI compute, storage and network hardware, software for the virtualization layer, and/or virtualized resources.

The term "network slicing" may be used in this application to refer to a type of virtual networking architecture in the same family as network functions virtualization (NFV) that allows for the creation of multiple virtual networks ("network slices") atop the shared physical infrastructure, commodity hardware or infrastructure as a service (IaaS) via the partitioning of network architectures into virtual elements. In order to access network slices in a 5G New Radio (NR) network, a wireless device first performs a registration request procedure in which it provides a requested network slice selection assistance information (NSSAI), message to a core access and mobility management function (AMF) component in the network. In response, the AMF component performs various authentication operations, which may include performing certain checks based on local policies, the UE device's subscriptions, information stored in the UE device's SIM card, etc., and verifying the network slices that can be provided to the UE device (e.g., provisioned for access and use by the UE device). If these operations are successful, the AMF component may generate and send an Allowed NSSAI message to the UE device that informs the UE device of the verified network slices that the UE device may access and use. In response to receiving the Allowed NSSAI message, the UE device may perform various protocol/packet data unit (PDU) session establishment operations to establish a connectivity to the network slices.

The terms "component," "system," and the like may be used herein to refer to a computer-related entity (e.g., hardware, firmware, a combination of hardware and software, software, software in execution, etc.) that is configured to perform particular operations or functions. For example, a component may be, but is not limited to, a process running on a processor, a processor, an object, an executable, a thread of execution, a program, and/or a computing device. By way of illustration, both an application running on a computing device and the computing device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known computer, processor, and/or process related communication methodologies.

The term "system on chip" (SoC) is used herein to refer to a single integrated circuit (IC) chip that contains multiple resources or independent processors integrated on a single substrate. A single SoC may contain circuitry for digital, analog, mixed-signal, and radio-frequency functions. A single SoC also may include any number of general purpose or specialized processors (e.g., network processors, digital signal processors, modem processors, video processors, etc.), memory blocks (e.g., ROM, RAM, Flash, etc.), and resources (e.g., timers, voltage regulators, oscillators, etc.). For example, an SoC may include an applications processor that operates as the SoC's main processor, central processing unit (CPU), microprocessor unit (MPU), arithmetic logic unit (ALU), etc. SoCs also may include software for controlling the integrated resources and processors, as well as for controlling peripheral devices.

The term "system in a package" (SIP) may be used herein to refer to a single module or package that contains multiple resources, computational units, cores or processors on two or more IC chips, substrates, or SoCs. For example, a SIP may include a single substrate on which multiple IC chips or semiconductor dies are stacked in a vertical configuration. Similarly, the SIP may include one or more multi-chip modules (MCMs) on which multiple ICs or semiconductor dies are packaged into a unifying substrate. A SIP also may include multiple independent SOCs coupled together via high speed communication circuitry and packaged in close proximity, such as on a single motherboard, in a single UE, or a single CPE device. The proximity of the SoCs facilitates high speed communications and the sharing of memory and resources.

The term "multicore processor" may be used herein to refer to a single integrated circuit (IC) chip or chip package that contains two or more independent processing cores (e.g., CPU core, graphics processor unit (GPU) core, etc.) configured to read and execute program instructions. A SoC may include multiple multicore processors, and each processor in an SoC may be referred to as a core. The term "multiprocessor" may be used herein to refer to a system or device that includes two or more processing units configured to read and execute program instructions.

The term "lightweight processor" may be used herein to refer to small, specialized, resource constrained, and/or energy efficient processor system, such as a system that implements the 32-bit VIPER microprocessor design created by Royal Signals and Radar Establishment (RSRE). The term "robust processor" may be used herein to refer to a more powerful and feature rich processor system, such as a system that implements the 64-bit ARMv8 processor architecture. A robust processor may process more tasks faster, and generate more accurate/precise results, than a lightweight processor. A robust processor may also consume more energy that a lightweight processor.

Many subscribers connect to the Internet via a customer premise equipment (CPE) component/device. A CPE device may include a cable modem, digital subscriber line modem, router, switch, firewall, packet filter, wireless access point, and/or a residential gateway that provide network connectivity to home or small office network. In particular, a CPE device may allow UE devices on the local area network (LAN) to connect to a wide area network (WAN) and ultimately the Internet. A CPE may include LAN ports (e.g., ports FE0-FE3, etc.) and a LAN-interface for communicating with the UE devices within the local network. The CPE may include a WAN port (e.g., port FE4, etc.) and a WAN-interface that allows the UE devices to communicate with devices outside of the local network.

The various embodiments improve the performance, efficiency and functioning of the service provider network and the components/devices that are included in, utilize, or benefit from the service provider network. For example, a CPE device configured in accordance with the various embodiments may provide a flexible balance of performance vs. cost between edge computing and cloud-based computing services, may perform traffic bonding of both 5G traffic and home network's Wi-Fi traffic to a single service flow, may allow for Wi-Fi data offloading of 5G traffic using a single service flow via the HFC network, and/or provide 5G virtual radio access network (vRAN) functionality for latency-sensitive applications (e.g., mobile Xhaul, IPTV, and other continuous real-time services). Additional improvements to performance and functioning of the communication system and its constituent network components will be evident from the disclosures below.

Figure 1B:
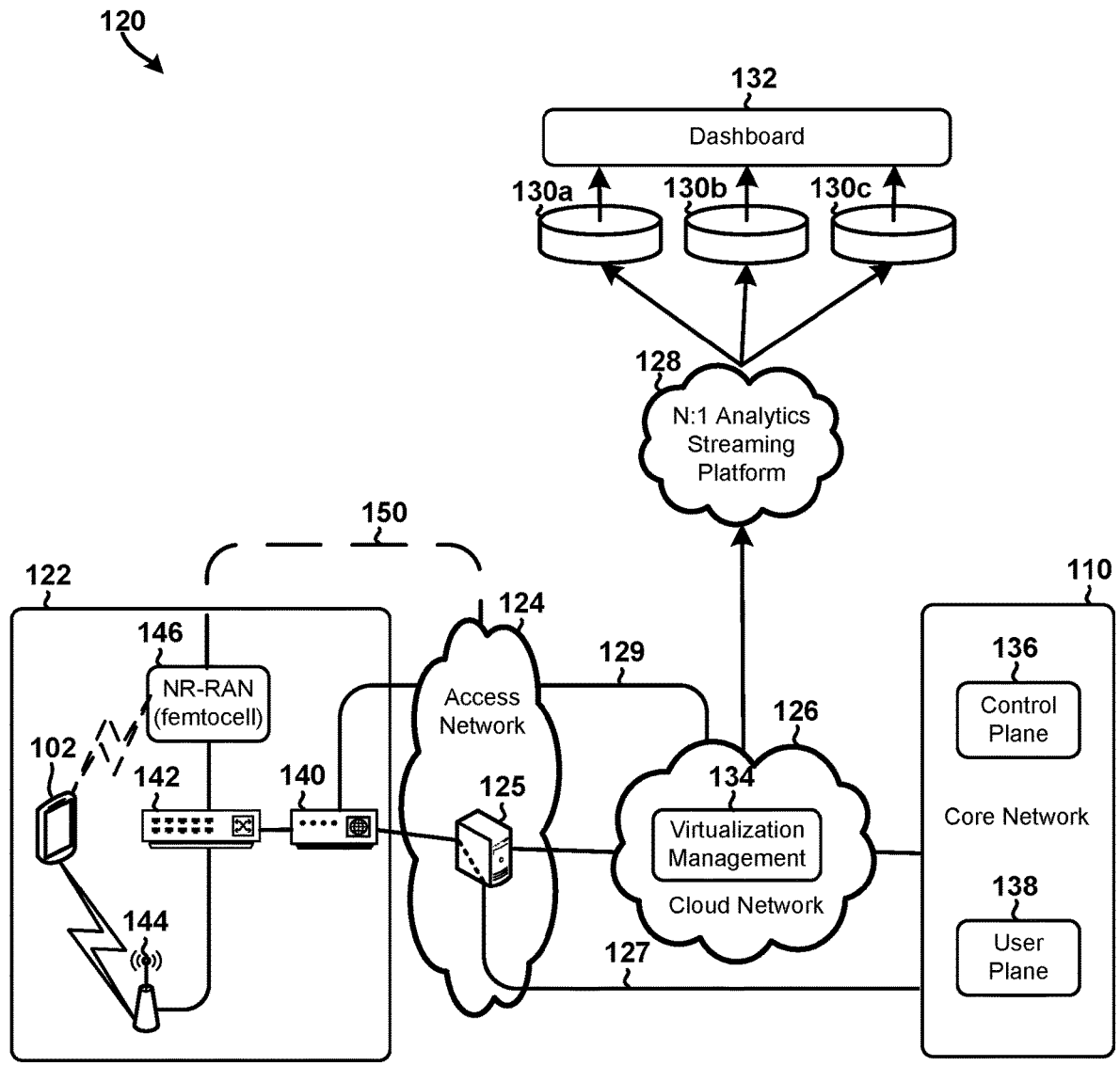
FIG. 1B is a system block diagram that illustrates a simplified converged 5G communications network, including a 5G network, a service provider's cloud network, HFC access network, and subscriber's home network, that is suitable for implementing various embodiments.
Figure 1C:
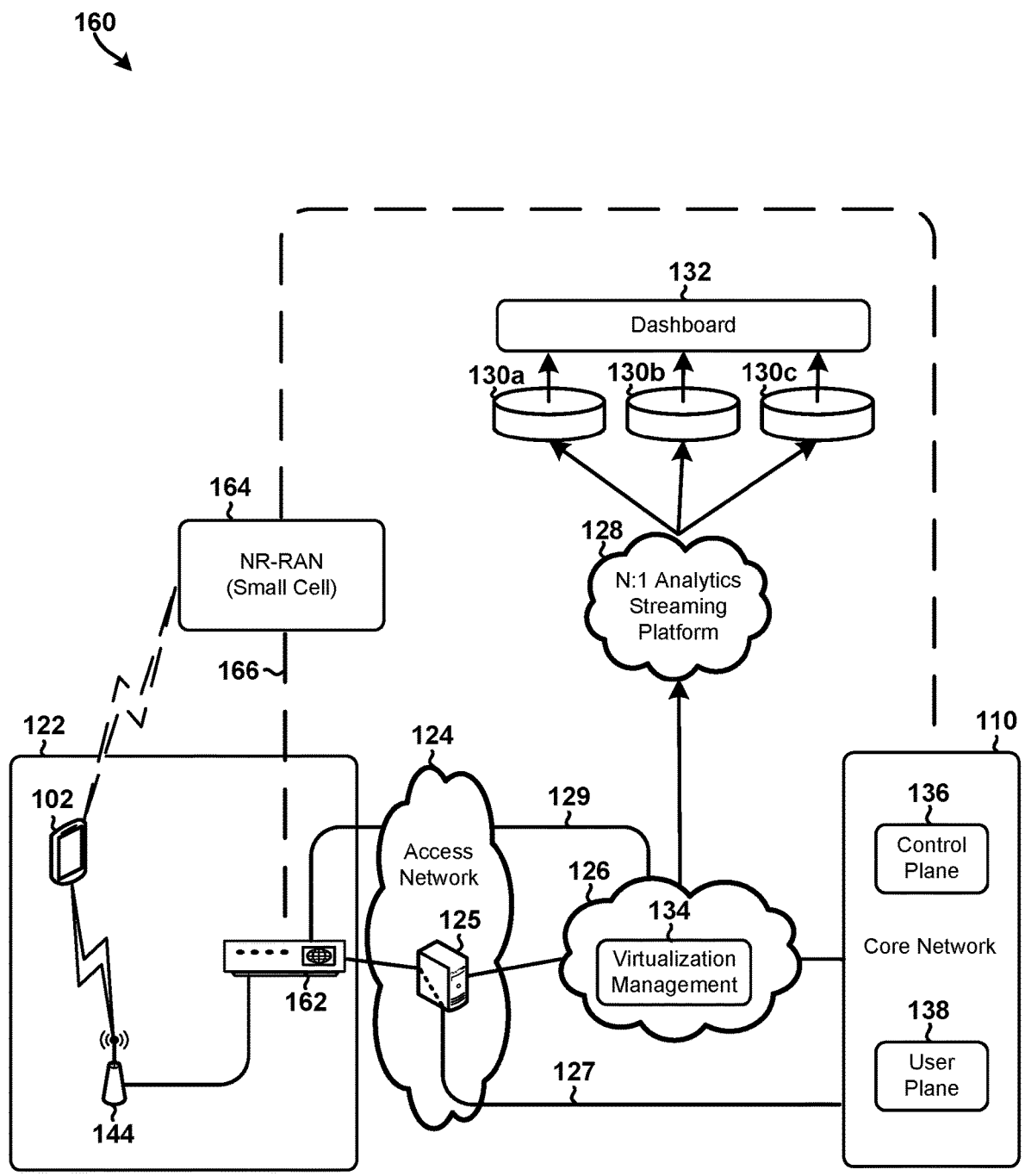
FIG. 1C is a system block diagram that illustrates a simplified converged 5G communications network with hybrid access CPE device in the home network suitable for implementing various embodiments.
Figure 1D:
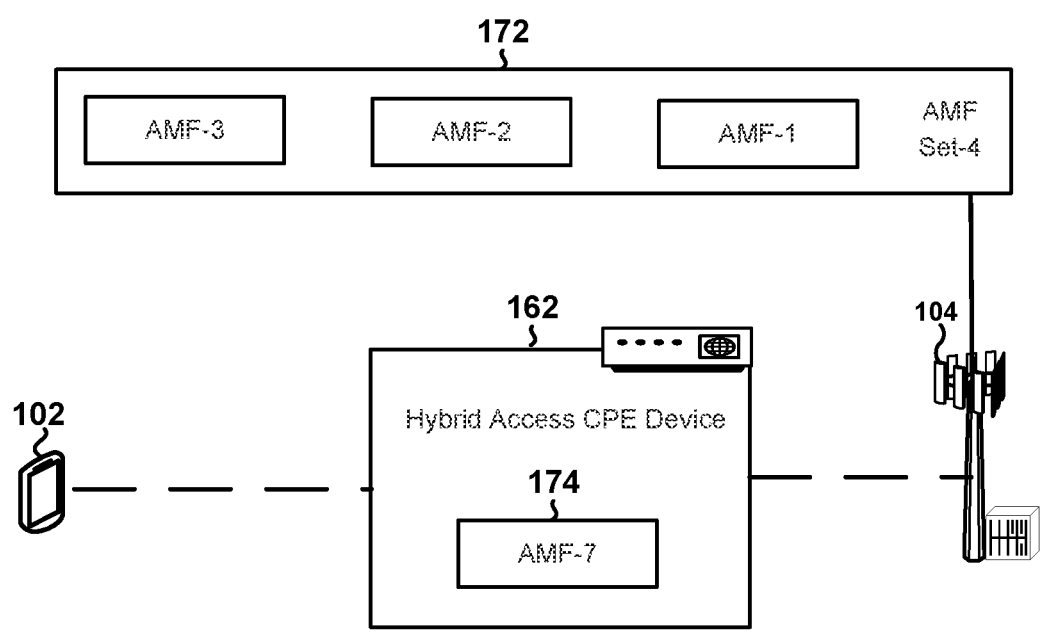
FIG. 1D is a system block diagram that illustrates that an access and mobility management function (AMF) may be added to the hybrid access CPE device to offload data traffic and processing demands from the AMFs in the 5G core network and to decrease latency to enhance the experience for latency-sensitive applications in accordance with some embodiments.

FIGS. 1A-1D illustrate example communications systems suitable for implementing various embodiments. In particular, FIG. 1A illustrates a simplified cell-based communications system 100, which may be a 5G NR network, an LTE network, or any other similar network. FIGS. 1B and 1C illustrate simplified converged 5G communications systems 120, 160, which may be convergence of three separate networks, such as a 5G core network (5GC) 110, a DOCSIS/HFC access network 124, operator's cloud network 126, and a home network (e.g., LAN, etc.) 122. FIG. 1D illustrates that an AMF may be included within a hybrid access CPE device in some embodiments.

The components in the communications systems 100, 120, 160 illustrated in FIGS. 1A-1C may communicate via wired or wireless communication links. Wired communication links may use a variety of wired networks (such as Ethernet, TV cable, telephony, fiber optic and other forms of physical network connections) that may use one or more wired communication protocols, such as Ethernet, Point-To-Point protocol, High-Level Data Link Control (HDLC), Advanced Data Communication Control Protocol (ADCCP), and Transmission Control Protocol/Internet Protocol (TCP/IP). Wireless communication links may include a plurality of carrier signals, frequencies, or frequency bands, each of which may include a plurality of logical channels. The wireless communication links may utilize one or more radio access technologies (RATs). Examples of RATs that may be used in a wireless communication link include 3GPP LTE, 3G, 4G, 5G (such as NR), GSM, Code Division Multiple Access (CDMA), Wideband Code Division Multiple Access (WCDMA), Worldwide Interoperability for Microwave Access (WIMAX), Time Division Multiple Access (TDMA), and other mobile telephony communication technologies cellular RATs. Further examples of RATs that may be used in one or more of the various wireless communication links within the communication system 100 include medium range protocols such as Wi-Fi, LTE-U, LTE-Direct, LAA, MulteFire, and relatively short range RATs such as ZigBee, Bluetooth, and Bluetooth Low Energy (LE).

With reference to FIG. 1A, a communications system 100 may include a UEs 102a-102e, base stations (BS) 104a-104d, cells 106a-106c, a network controller 108, and a core network 110. The UEs 102a-102e may be dispersed throughout communications system 100, and each UE 102a-102e may be stationary or mobile. Some UEs 102a-102e may be considered Internet-of-Things (IoT) devices or may be implemented as NB-IoT (narrowband internet of things) devices. Some UEs 102a-102e may be considered machine-type communication (MTC) or evolved or enhanced machine-type communication (eMTC) UEs. MTC and eMTC UEs include, for example, robots, drones, remote devices, sensors, meters, monitors, location tags, etc., that may communicate with other components or entities via wired or wireless communication links.

The base stations 104a-104d may be referred to as an NodeB, a Node B, an LTE evolved nodeB (eNB), a radio head, a transmit receive point (TRP), a New Radio base station (NR BS), a 5G NodeB (NB), a Next Generation NodeB (gNB), or the like. Each base station 104a-104d may provide communication coverage for a particular geographic area. Each base station 104a-104d may also provide communication coverage for a macro cell, a picocell, a femtocell, another type of cell, or a combination thereof. A macro cell 106a may cover a relatively large geographic area (e.g., several kilometers in radius) and may allow unrestricted access by UEs 102a-102e with service subscription. A pico cell 106b may cover a relatively small geographic area and may allow unrestricted access by UEs (e.g., 102b) with service subscription. A femtocell 106c may cover a relatively small geographic area (e.g., a home) and may allow restricted access by UEs (e.g., 102c) having association with the femto cell (e.g., UEs in a closed subscriber group (CSG), etc.). That is, a femtocell is a small low-power cellular base station connected to the service provider's network via a broadband Internet connection either in a home network or in a small business network. It does not typically support all of the mobility handover/handoff functions that a small cell supports. A small cell is a small low-power cellular radio access node that operates in licensed and unlicensed spectrum connected to service provider's network via broadband Internet connection in a home network or in a small business network.

In the example illustrated in FIG. 1A, base station 104a may be a macro base station (macro BS) for a macro cell 106a, base station 104b may be a base station for a pico cell 106b, and base station 104c may be a femto base station for a femtocell 106c. In addition, base station 104d may be relay station. A relay station is an entity that can receive a transmission of data from an upstream station (e.g., a base station or a UE) and send a transmission of the data to a downstream station (e.g., a UE or a base station). The relay base station 104d may communicate with the macro base station 104a and the UE 102d in order to facilitate communication between the macro base station 104a and the UE 102d.

The different types of base stations 104a-104d may have different transmit power levels and/or different coverage areas. For example, macro base stations (e.g., base station 104a) may have a high transmit power level (e.g., Macro BS Tx power of about +46 dBm or about 40 W, etc.), whereas picocell base stations (e.g., base station 104b), femto base stations (e.g., base station 104c), and relay base stations (e.g., base station 104e) may have much lower transmit power levels (e.g., Femtocell BS Tx power of about +20 dBm or 100 mW, etc.).

A network controller 108 may be coupled to a set of base stations 104a-104d and may provide coordination and control for each of the base stations 104a-104d. The network controller 108 may communicate with the base stations 104a-104d via a backhaul. The base stations 104a-104d also may communicate with one another directly or indirectly via a wireless or wireline backhaul.

With reference to FIG. 1B, a converged communication system 120 may include a core network 110 (e.g., a core 5G network, etc.), a LAN or home network 122, and an access network 124 (e.g., DOCSIS network, HFC network, etc.) that includes a terminal component 125. The communication system 120 may also include a cloud network 126 (e.g., opensync cloud system, etc.), an analytics streaming platform 128, various data sources 130a-130c, and a dashboard 132. The cloud network 126 may include a virtualization management 134 component. The core network 110 may include a control plane 136 component and a user plane 138 component. The LAN or home network 122 may include UE 102, an access CPE gateway 140, a layer 2 switch 142, a Wi-Fi Access Point (AP) 144, and an indoor Next-Generation RAN (NR-RAN) 146.

The access network 124 may include various network components for providing consumers with access to the Internet or IP services over broadband connections. In various embodiments, the access network 124 may include hybrid fiber-coaxial (HFC) network and/or a passive optical network (PON), such as an Ethernet passive optical network (EPON), gigabit capable passive optical network (GPON), broadband passive optical network (BPON), or radio frequency over glass (RFoG) network.

The terminal component 125 may be configured to facilitate high speed communications between the access CPE gateway 140 (e.g., a cable modem of the CPE gateway 140, etc.) and the components within the access network 124. In various embodiments, the terminal component 125 may include an optical line terminal (OLT), an optical network terminal (ONT), a digital subscriber line access multiplexer (DSLAM), or a cable modem termination system (CMTS).

The access CPE gateway 140 may be connected via the layer 2 switch 142 to the AP 144 and the NR-RAN 146. The CPE gateway 140 may also include a cable modem (not illustrated separately), which may be operating as a network bridge that provides bi-directional data communication between the AP 144 and/or NR-RAN 146 and the access network 124 infrastructure. In some embodiments, the access CPE gateway 140 may include an integrated voice gateway, routers, packet offload engines, powerful processors, system-on-chips (SoCs), memories, antennas, power amplifiers, and other resources (e.g., power rails, etc.) that support high-speed wireless communications and are capable of executing complex software applications.

The NR-RAN 146 may be configured to enable PHY/MAC layer data connectivity from 5G UE 102 devices to the access network 124. The NR-RAN 146 unit may form a femtocell in the home network 122. A femtocell may be a small low-power cellular base station (e.g., base station 104c, etc.) connected to the service provider's network via a broadband Internet connection either in a home network or in a small business network. A femtocell does not typically support all of the mobility handover/handoff functions that a small cell supports.

Separate traffic service flows 127, 129 may be allocated to UE 102 traffic through the access network 124. For example, the access CPE gateway 140 may operate in a bridge mode with two service flows 127, 129, one service flow 127 for the 5G traffic connectivity to the core network 110 via the terminal component 125, and another service flow 129 for the user home network traffic to the cloud network 126 (e.g., opensync cloud system, etc.).

With reference to FIG. 1C, a converged communications system 160 may also include a hybrid access CPE device 162 that is configured or equipped with a 5G air interface 166 for communicating with an NR-RAN 164 that is configured to operate as a small cell. Small cells are typically a small low-power cellular radio access node that operates in licensed and unlicensed spectrum connected to service provider's network via broadband Internet connection in a home network or in a small business network. The NR-RAN 164 may be located inside or outside the home network 122.

The hybrid access CPE device 162 may also include cable modem hardware (DOCSIS cable modem, etc.) and/or software for broadband Internet access, an agile software stack (e.g., OpenWrt software stack integrated with routing functionality and silicon (SI) vendor software development kit, etc.), an OpenSync™ layer for command/control and data telemetry via the cloud network 126 (e.g., OpenSync™ cloud system, etc.), and/or a LAN port interface for communicating with a Wi-Fi AP 144 or Wi-Fi extender in the home network 122. In some embodiments, the hybrid access CPE device 162 may be configured to provide 5G virtual radio access network (vRAN) functionality (e.g., virtualized baseband units, etc.) that supports latency-sensitive applications.

In some embodiments, the SoC architecture of an access CPE device 162 may include of two different SoCs. For example, as discussed further below with reference to FIG. 2B, an access CPE device 162 may include a first SoC (SoC A) and a second SoC (SoC B). The first SoC (SoC A) may include a lightweight CPU (e.g., VIPER processor, etc.), DOCSIS cable modem software, and voice gateway firmware. The second SoC (SoC B) may include a much more powerful CPU (e.g., an ARMv7 processor, etc.) and a silicon vendor software development kit (SDK). The second SoC (SoC B) may be configured to operate as a residential gateway (RG) CPU, and may include may resources (e.g. processing resources, etc.) that would remain mostly unused by conventional CPE devices. Some embodiments may leverage these under-utilized resources of the second SoC to support 5G edge computing services.

The hybrid access CPE device 162 may include both a DOCSIS cable modem for broadband Internet access and implement 5G UE functionality via the air interface 166 to the NR-RAN 164. Examples of such 5G UE functionality include radio resource management, mobility management, call control, session management, and identity management.

In some embodiments, the hybrid access CPE device 162 may be configured to aggregate the bandwidth of both wireless and wireline networks in a single multi-access PDU session, and transmit PDUs, simultaneously to both networks using Multipath TCP (MPTCP).

In some embodiments, the hybrid access CPE device 162 may include a 10G EPON hybrid S-ONU hardware and a corresponding software stack suitable for broadband Internet access.

In some embodiments, the hybrid access CPE device 162 or converged communications system 160 may be configured to use (or allow the use of) DOCSIS Provisioning over Ethernet (DPoEv2) for service provisioning.

In some embodiments, the converged communications system 160 may include a PON network between the OLT (e.g., terminal component 125) and a hybrid S-ONU (not illustrated separately in FIG. 1C) in the home network 122.

In some embodiments, the hybrid access CPE device 162 may be configured to offload Wi-Fi data with a single service flow. For example, the UE 102 device may commence consuming real-time services outside the range of the home network 122 via its 5G NR components (e.g., 5G Modem Processor, etc.). When the UE 102 is moved within range of the home network 122, the UE 102 may join the Wi-Fi home network and offload the 5G NR traffic to the in-home Wi-Fi network, which uses a single service flow to support both the 5G NR mobile traffic and the in-home Wi-Fi traffic.

If the UE 102 device is a roaming device, and connects to a visited Wi-Fi home network, the 5G mobile traffic must be transported via an encrypted L2 tunneling protocol (L2TP or other tunneling technology) to ensure traffic isolation between the visited Wi-Fi home network and the UE 102 device. Since there is only a single service flow, both the roamer traffic and the visited Wi-Fi home network traffic receive the same treatment unless other techniques to prioritize, police, and rate shape traffic are used. The use of a single common service flow to conserve the consumption of service flows may be beneficial to some MSOs to provision and support the required service flows for each UE 102 device.

In the above example, the hybrid access CPE device 162 provides the UE 102 a number of unique advantages. For example, hybrid access CPE device 152 provides a flexible balance of performance vs. cost between edge computing and cloud-based computing services. The hybrid access CPE device 162 performs traffic bonding of both 5G traffic and home network's Wi-Fi traffic to a single service flow (i.e., limited number of service flows may be available on any CMTS). The hybrid access CPE device 162 also allows for Wi-Fi data offloading of 5G traffic using a single service flow via the HFC network, which may be a huge benefit to MVNO operators. The hybrid access CPE device 162 may also enable latency-sensitive applications such as mobile Xhaul (carrying mobile traffic over DOCSIS access network), Internet Protocol TV (IPTV), and continuous real-time services.

Generally, 5G NR networks separate the former mobility management entity (MME) of 4G/LTE into modular functions at the 5G core in the cloud. The core session management function (SMF) is responsible for the managing sessions from the UE, and an AMF component is responsible for connection and mobility management tasks, including ciphering, integrity protection, authentication, and key agreement requests. FIG. 1D illustrates that a 5G Core AMF (AMF-7) 174 may be integrated into the software stack of the hybrid access CPE device 162 to offload data traffic and processing demands from the AMFs in the 5G core and in order to decrease the UE latency, and to enhance the experience for latency-sensitive situations.

With reference to FIGS. 1C and 1D, the hybrid access CPE device 162 may be configured to perform various authentication operations to be authenticated by the terminal component 125 (e.g. a CMTS) and/or to be admitted onto the access network 124. The hybrid access CPE device 162 may then register with the core network 110 via a provisioned service flow and access network 124 (DOCSIS). The hybrid access CPE device 162, a multiple-system operator (MSO), a telco provider and/or another component in the system 160 may perform various operations to integrate AMF-7 174 into VNFs or containers of the hybrid access CPE device 162, update the relevant AMF set 172 to include the new AMF, and update a globally unique AMF identifier (GUAMI) component in the core network 110 to include the AMF set ID and the AMF region ID of the AMF-7 174. The AMF set 172 may be an information unit used by 5G NR networks that includes a list of available AMFs (i.e., AMF-1, AMF-2, AMF-3, etc.) for selection based on closest geography to the UE. After the GUAMI component is updated, the AMF-7 174 becomes available for selection by the core network 110.

The UE 102 and the base station 104 (e.g., gNB, etc.) may exchange several initial setup messages. The final initial setup message (e.g., RRCSetupComplete) may include a registration request, which the base station 104 may send to an existing AMF (e.g., AMF-1) in the core network 110, along with an identifier from the base station 104 named 'RAN UE Next-Generation Application Protocol (NGAP) ID' that supports UE context on that base station 104. The RAN UE NGAP ID may include an AMF set ID field that contains the available AMF choices for that area, including AMF-7 174. Due to its proximity to the UE device, AMF-7 174 will be selected as the new AMF.

Figure 2A:
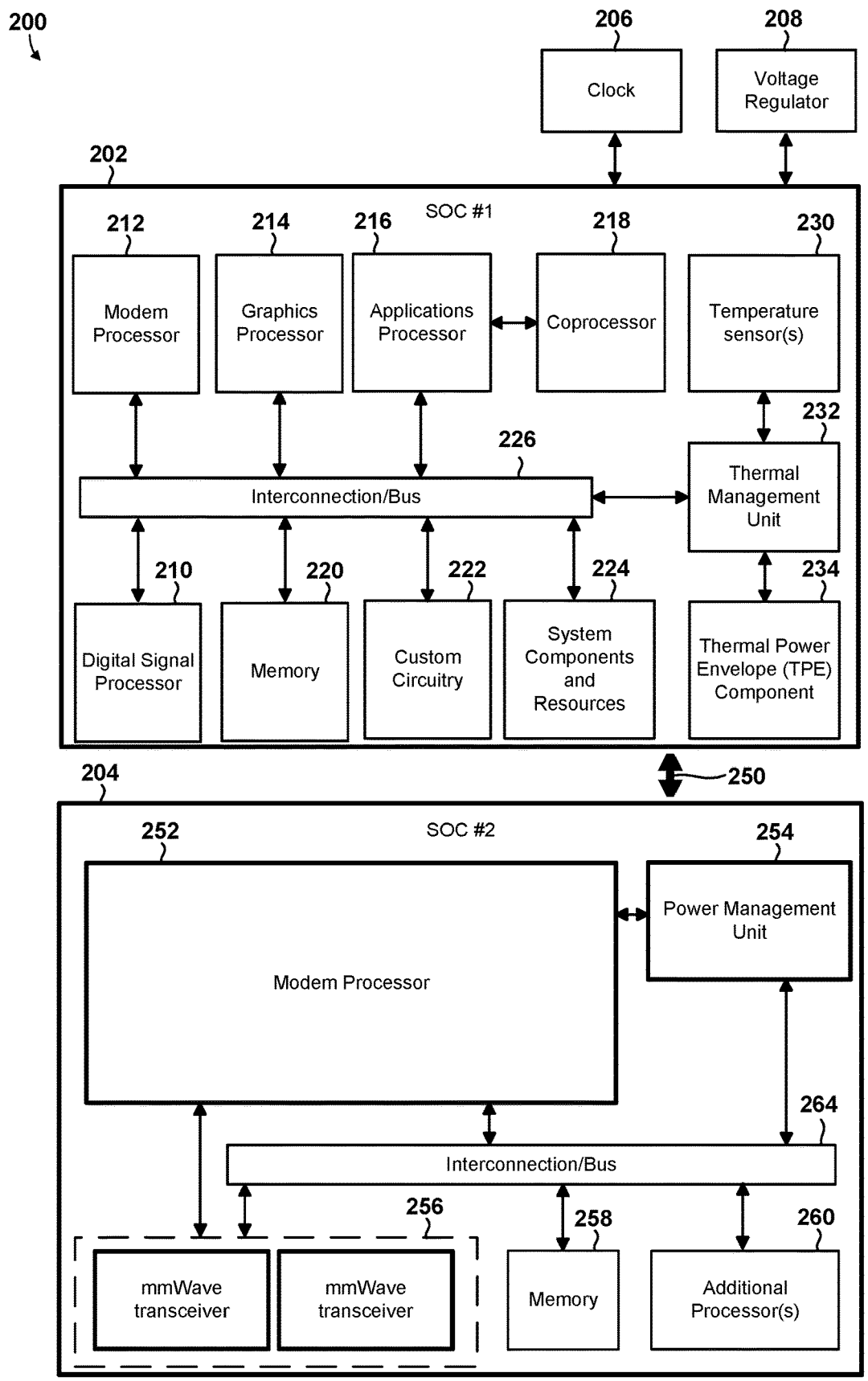
FIG. 2A is a component block diagram illustrating a computing architecture that may be used in a user equipment device and/or a hybrid access CPE device implementing various embodiments.
Figure 2B:
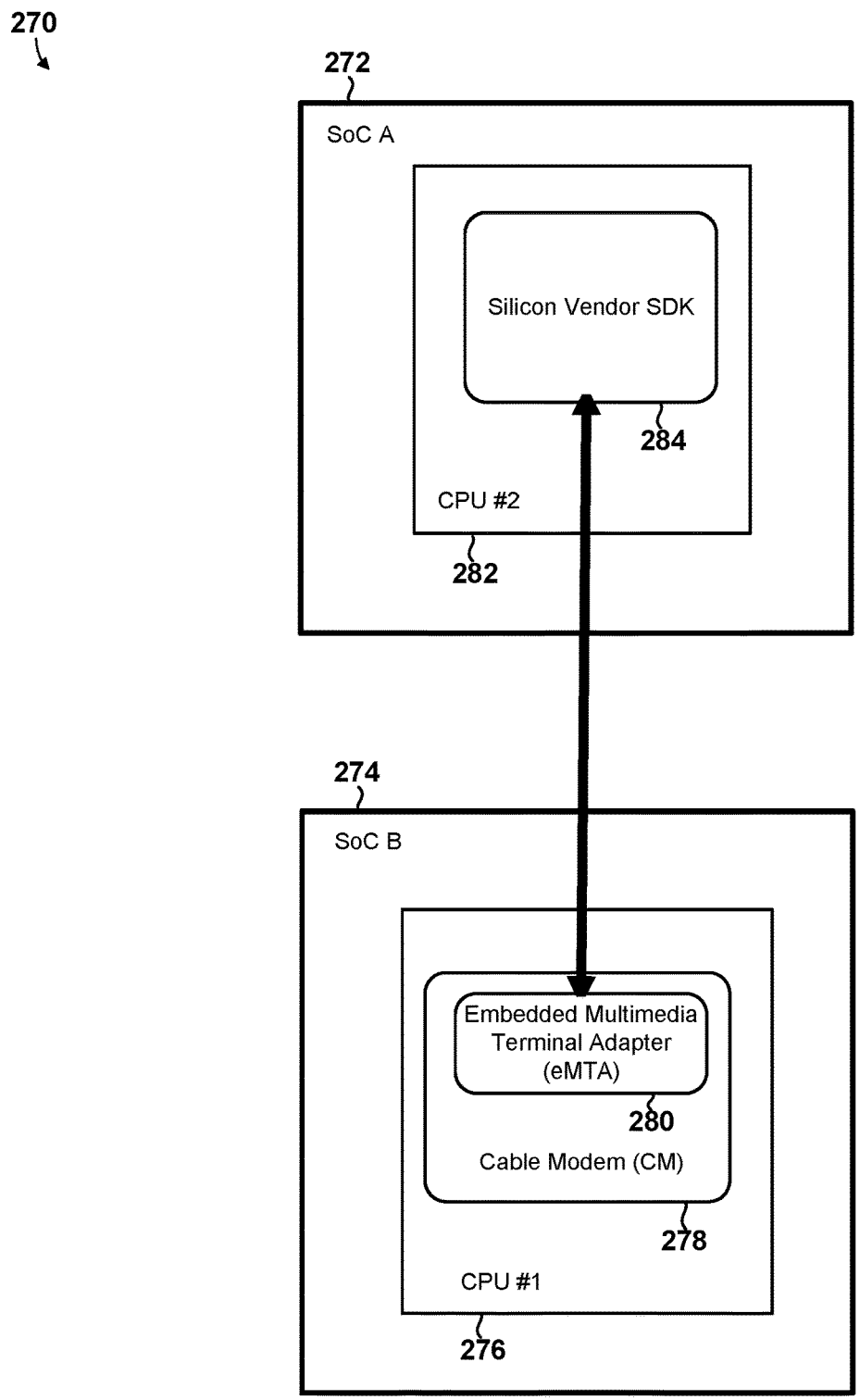
FIG. 2B is a component block diagram illustrating a computing architecture that may be used in a hybrid access CPE device implementing various embodiments.

The embodiments may be implemented on a number of single processor and multiprocessor computer systems, including a system-on-chip (SoC) or system in a package (SIP). FIGS. 2A and 2B illustrate example computing system, SoC or SIP 200 architecture that may be used in a UE or CPE device (e.g., access CPE gateway 140, hybrid access CPE device 162 162, etc.) implementing the various embodiments.

In the example illustrated in FIG. 2A, the SIP 200 includes a two SoCs 202, 204, a clock 206, and a voltage regulator 208. In some embodiments, the first SoC 202 operate as central processing unit (CPU) of the device that carries out the instructions of software application programs by performing the arithmetic, logical, control and input/output (I/O) operations specified by the instructions. In some embodiments, the second SoC 204 may operate as a specialized processing unit. For example, the second SoC 204 may operate as a specialized 5G processing unit responsible for managing high volume, high speed (such as 5 Gbps, etc.), or very high frequency short wavelength (such as 28 GHz mmWave spectrum, etc.) communications.

The first SoC 202 may include a digital signal processor (DSP) 210, a modem processor 212, a graphics processor 214, an application processor 216, one or more co-processors 218 (such as vector co-processor) connected to one or more of the processors, volatile and non-volatile memory 220, custom circuitry 222, system components and resources 224, an interconnection/bus module 226, one or more temperature sensors 230, a thermal management unit 232, and a thermal power envelope (TPE) component 234. The second SoC 204 may include a 5G modem processor 252, a power management unit 254, an interconnection/bus module 264, a plurality of mmWave transceivers 256, volatile and non-volatile memory 258, and various additional processors 260, such as an applications processor, network processor, etc.

Each processor 210, 212, 214, 216, 218, 252, 260 may include one or more cores, and each processor/core may perform operations independent of the other processors/cores. For example, the first SoC 202 may include a processor that executes a first type of operating system (such as FreeBSD, LINUX, OS X, etc.) and a processor that executes a second type of operating system (such as MICROSOFT WINDOWS 10). In addition, any or all of the processors 210, 212, 214, 2165, 218, 252, 260 may be included as part of a processor cluster architecture (such as a synchronous processor cluster architecture, an asynchronous or heterogeneous processor cluster architecture, etc.).

The first SoC 202 and second SoC 204 may include various system components, resources and custom circuitry for managing sensor data, analog-to-digital conversions, wireless data transmissions, and for performing other specialized operations, such as decoding data packets and processing encoded audio and video signals for rendering in a web browser. For example, the system components and resources 224 of the first SoC 202 may include power amplifiers, voltage regulators, oscillators, phase-locked loops, peripheral bridges, data controllers, memory controllers, system controllers, access ports, timers, and other similar components used to support the processors and software clients running on a UE device. The system components and resources 224 or custom circuitry 222 also may include circuitry to interface with peripheral devices, such as cameras, electronic displays, wireless communication devices, external memory chips, etc.

The first SoC 202 and second SoC 204 may communicate via interconnection/bus module 264. The various processors 210, 212, 214, 216, 218, may be interconnected to one or more memory elements 220, system components and resources 224, and custom circuitry 222, and a thermal management unit 232 via an interconnection/bus module 226. Similarly, the modem processor 252 may be interconnected to the power management unit 254, the mmWave transceivers 256, memory 258, and various additional processors 260 via the interconnection/bus module 264. The interconnection/bus module 226, 250, 264 may include an array of reconfigurable logic gates or implement a bus architecture (such as CoreConnect, AMBA, etc.). Communications may be provided by advanced interconnects, such as high-performance networks-on chip (NoCs).

The first SoC 202 and second SoC 204 may further include an input/output module (not illustrated) for communicating with resources external to the first SoC 202 and second SoC 204, such as a clock 205 and a voltage regulator 208. Resources external to the first SoC 202 and second SoC 204 (such as clock 205, voltage regulator 208) may be shared by two or more of the internal SoC processors/cores.

In addition to the example SIP 200 discussed above, some embodiments may be implemented in a wide variety of computing systems, which may include a single processor, multiple processors, multicore processors, or any combination thereof.

FIG. 2B illustrates SoC/SIP architecture of an example computing device 270 (hybrid access CPE device 162 illustrated and discussed above with reference to FIG. 1C, etc.) that may be configured to support 5G edge computing services in accordance with the embodiments. In the example illustrated in FIG. 2B, the computing device 270 includes a first SoC (SoC A) 272 and a second SoC (SoC B) 274. The first SoC (SoC A) 272 may correspond to SoC 1 202 illustrated in FIG. 2A, and may be configured to operate as a residential gateway (RG). The first SoC (SoC A) 272 may include powerful processors (e.g., ARMv7 processor, etc.) that operate as its CPU 282 and a silicon vendor software development kit (SDK) 284.

The second SoC (SoC B) 274 may correspond to SOC 2 204 illustrated in FIG. 2A, and may include a lightweight processor (e.g., VIPER processor, etc.) that operates as its CPU 276, a cable modem (CM) 278, and an embedded multimedia terminal adapter (eMTA) 278, any or all of which may be configured to execute DOCSIS cable modem software and/or voice gateway firmware.

In some embodiments, the computing device 270 may equipped with an agile software stack, an OpenSync™ layer for command/control and data telemetry, and/or a LAN port interface for communicating with a Wi-Fi access point or extender in the home network. In some embodiments, the computing device 270 may be configured to provide 5G virtual radio access network (vRAN) functionality (e.g., virtualized baseband units, etc.) that supports latency-sensitive applications.

In some embodiments, the first SoC (SoC A) 272 may be configured to implement 5G functionality (e.g., radio resource management, mobility management, call control, session management, identity management, etc.) and/or to provide 5G edge computing services to 5G NR UE device (e.g., the device 200 illustrated in FIG. 2A, etc.). The second SoC (SoC B) 274 may be configured to perform operations for providing a UE with broadband Internet access. The CPU 282 in the first SoC (SoC A) 272 may be much more powerful than the CPU 276 in the second SoC (SoC B) 274.

In some embodiments, the computing device 270 may be configured to establish a first connection to an access point component, establish a second connection between the CPE device and a NR Access Network (NR-RAN) component (e.g., an over-the-air connection, etc.), receive 5G New Radio (NR) mobile traffic via the first connection, receive in-home Wi-Fi traffic via the second connection, and use a single service flow (or more than one service flow) to support the 5G NR mobile traffic and the in-home Wi-Fi traffic.

In some embodiments, the computing device 270 may be configured to provide a flexible balance of performance vs. cost between edge computing and cloud-based computing services, perform traffic bonding of both 5G traffic and home network's Wi-Fi traffic to a single service flow, allow for Wi-Fi data offloading of 5G traffic using a single service flow via the HFC network, and/or to provide 5G virtual radio access network (vRAN) functionality for latency-sensitive applications (e.g., mobile Xhaul, IPTV, and other continuous real-time services).

Figure 3:
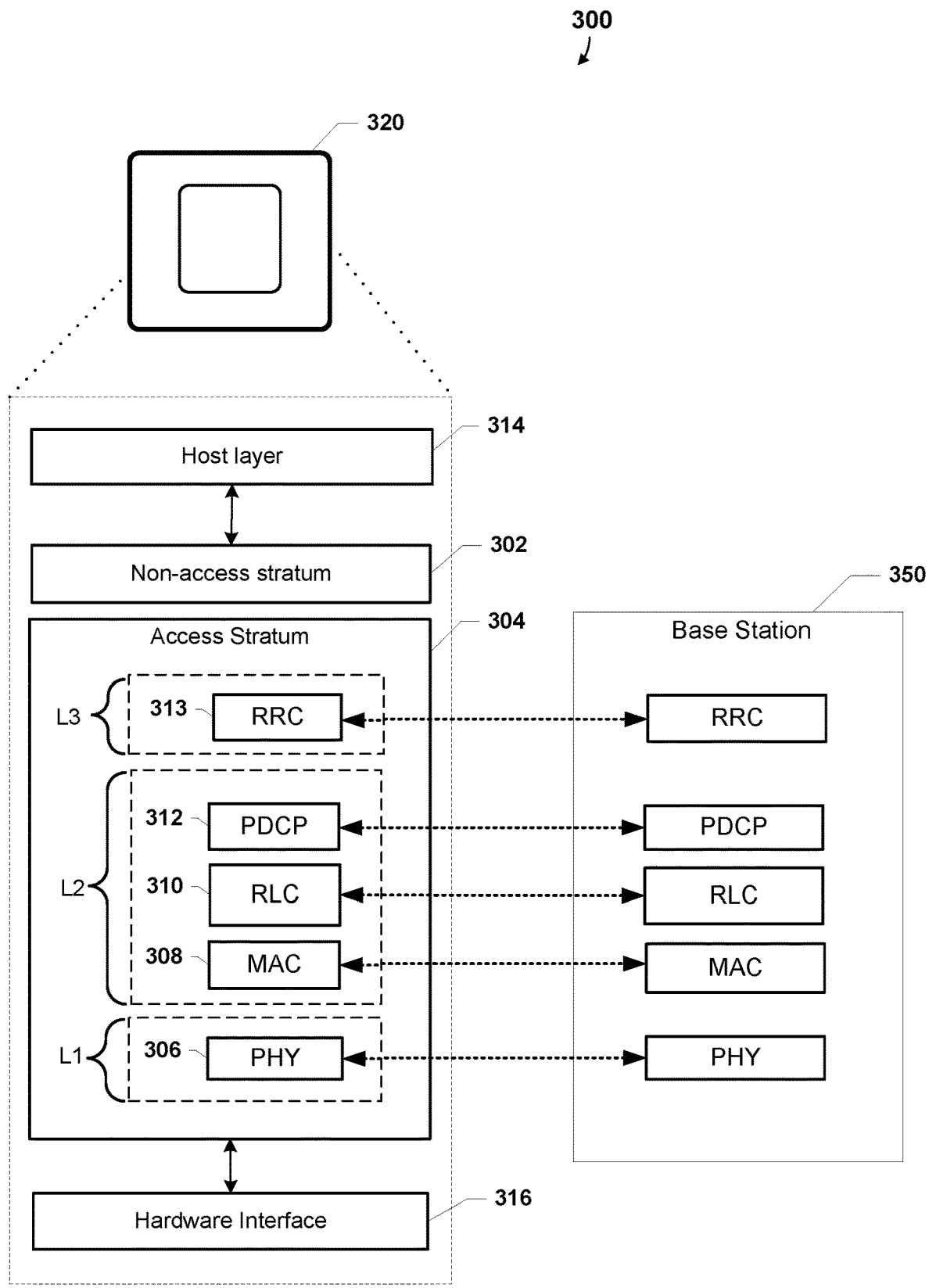
FIG. 3 is a component block diagram illustrating a software stack that could be used to implement various embodiments.

FIG. 3 illustrates an example of a software architecture 300 including a radio protocol stack for the user and control planes in wireless communications between a base station 350 (e.g., base station 104a-104d, NR-RAN 146, 164, etc.) and a wireless device 320 (e.g., any of the UEs 102 discussed above). The wireless device 320 may implement the software architecture 300 to communicate with the base station 350 of a communication system (such as 100, 120, 160). In various embodiments, layers in software architecture 300 may form logical connections with corresponding layers in software of the base station 350. The software architecture 300 may be distributed among one or more processors (such as the processors 212, 214, 216, 218, 252, 260). While illustrated with respect to one radio protocol stack, in a multi-SIM (subscriber identity module) wireless device, the software architecture 300 may include multiple protocol stacks, each of which may be associated with a different SIM (such as two protocol stacks associated with two SIMs, respectively, in a dual-SIM wireless communication device). While described below with reference to LTE communication layers, the software architecture 300 may support any of variety of standards and protocols for wireless communications, or may include additional protocol stacks that support any of variety of standards and protocols wireless communications.

The software architecture 300 may include a Non-Access Stratum (NAS) 302 and an Access Stratum (AS) 304. The NAS 302 may include functions and protocols to support packet filtering, security management, mobility control, session management, and traffic and signaling between a SIM(s) of the wireless device (such as SIM(s) 204) and its core network. The AS 304 may include functions and protocols that support communication between a SIM(s) (such as SIM(s) 204) and entities of supported access networks (such as a base station). In particular, the AS 304 may include at least three layers (Layer 1, Layer 2, and Layer 3), each of which may contain various sub-layers.

In the user and control planes, Layer 1 (L1) of the AS 304 may be a physical layer (PHY) 306, which may oversee functions that enable transmission or reception over the air interface. Examples of such physical layer 306 functions may include cyclic redundancy check (CRC) attachment, coding blocks, scrambling and descrambling, modulation and demodulation, signal measurements, MIMO, etc. The physical layer may include various logical channels, including the physical downlink control channel (PDCCH) and the physical downlink shared channel (PDSCH).

In the user and control planes, Layer 2 (L2) of the AS 304 may be responsible for the link between the wireless device 320 and the base station 350 over the physical layer 306. In some embodiments, Layer 2 may include a media access control (MAC) sublayer 308, a radio link control (RLC) sublayer 310, and a packet data convergence protocol (PDCP) 312 sublayer, each of which form logical connections terminating at the base station 350.

In the control plane, Layer 3 (L3) of the AS 304 may include a radio resource control (RRC) sublayer 3. While not shown, the software architecture 300 may include additional Layer 3 sublayers, as well as various upper layers above Layer 3. In some embodiments, the RRC sublayer 313 may provide functions including broadcasting system information, paging, and establishing and releasing an RRC signaling connection between the wireless device 320 and the base station 350.

In some embodiments, the PDCP sublayer 312 may provide uplink functions including multiplexing between different radio bearers and logical channels, sequence number addition, handover data handling, integrity protection, ciphering, and header compression. In the downlink, the PDCP sublayer 312 may provide functions that include in-sequence delivery of data packets, duplicate data packet detection, integrity validation, deciphering, and header decompression.

In the uplink, the RLC sublayer 310 may provide segmentation and concatenation of upper layer data packets, retransmission of lost data packets, and Automatic Repeat Request (ARQ). In the downlink, while the RLC sublayer 310 functions may include reordering of data packets to compensate for out-of-order reception, reassembly of upper layer data packets, and ARQ.

In the uplink, MAC sublayer 308 may provide functions including multiplexing between logical and transport channels, random access procedure, logical channel priority, and hybrid-ARQ (HARQ) operations. In the downlink, the MAC layer functions may include channel mapping within a cell, de-multiplexing, discontinuous reception (DRX), and HARQ operations.

While the software architecture 300 may provide functions to transmit data through physical media, the software architecture 300 may further include at least one host layer 314 to provide data transfer services to various applications in the wireless device 320. In some embodiments, application-specific functions provided by the at least one host layer 314 may provide an interface between the software architecture and the general purpose processor 260.

In some other embodiments, the software architecture 300 may include one or more higher logical layer (such as transport, session, presentation, application, etc.) that provide host layer functions. For example, in some embodiments, the software architecture 300 may include a network layer (such as IP layer) in which a logical connection terminates at a packet data network (PDN) gateway (PGW). In some embodiments, the software architecture 300 may include an application layer in which a logical connection terminates at another device (such as end user device, server, etc.). In some embodiments, the software architecture 300 may further include in the AS 304 a hardware interface 315 between the physical layer 306 and the communication hardware (such as one or more RF transceivers).

Figure 4:
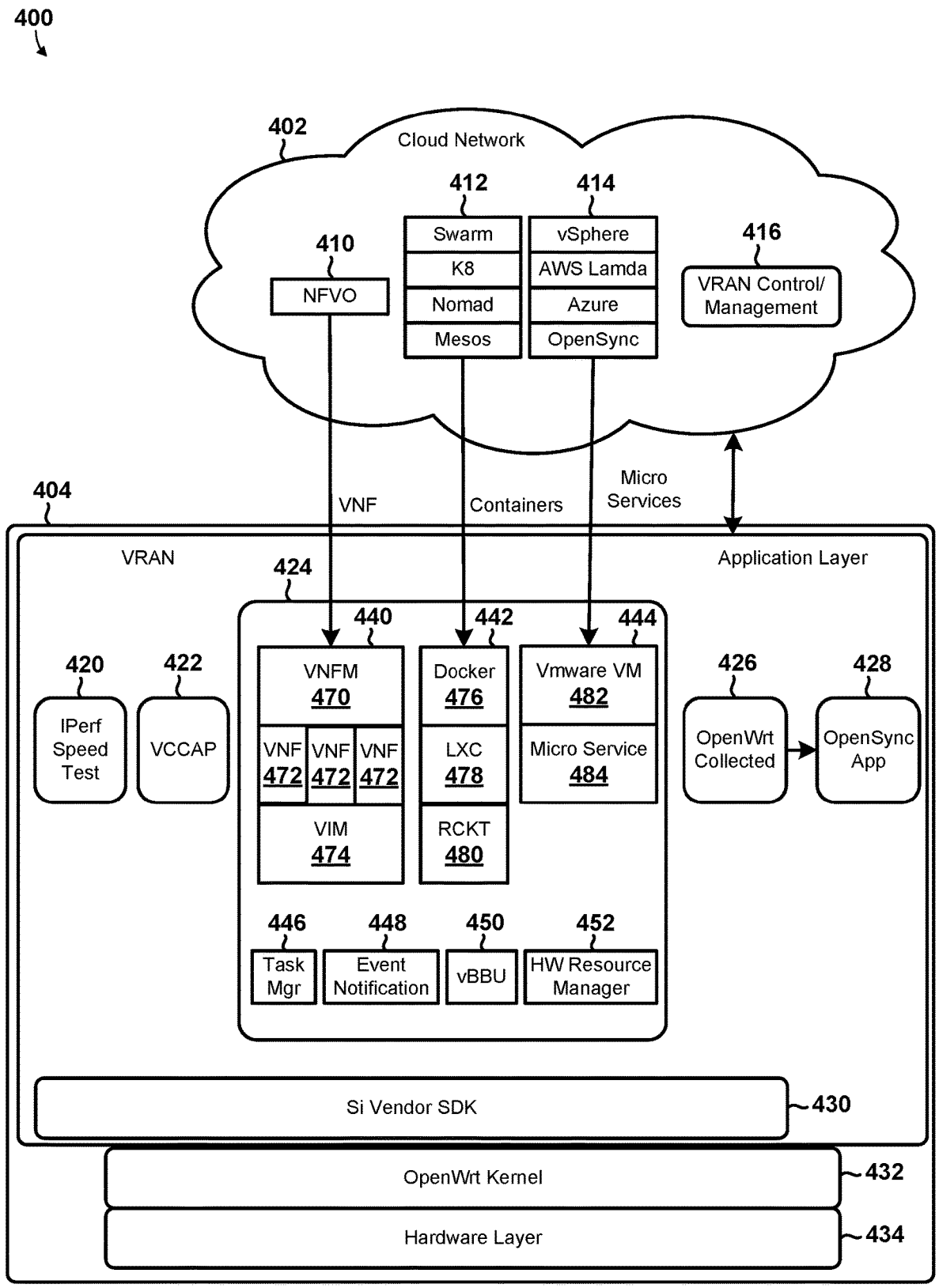
FIG. 4 is a component block diagram illustrating a software stack and components of a access CPE device and their interaction with operator's cloud network that could be used to implement some embodiment.

FIG. 4 illustrates an system 400 in which real time components that are latency sensitive are offloaded onto the access CPE device 404. In particular, the system 400 illustrated in FIG. 4 includes a cloud network 402 and an access CPE device 404 that may be configured to implement some embodiments. The cloud network 402 includes a network function virtualization orchestrator (NFVO) 410 component, container management and orchestration systems 412, micro service management and orchestration systems 414, and a vRAN control and management system 416. The access CPE device 404 may include a iPerf speed test 420 component, a virtual converged cable access platform (vC-CAP) 422 component, a manager 424 component, an OpenWrt collected 426 component, an OpenSync™ App 428 component, a Silicon vendor's software development kit (SDK) 430 component, an OpenWrt Kernel 432 component, and a hardware layer 434. The vRAN manager 424 component may include VNF managers 440, container managers 442, microservice managers 444, a task manager 446, an event notification 448 component, a virtualized baseband unit (vBBU) 450, and/or a hardware resource manager 452.

The vRAN manager 424 component may include all or portions of a VNF system, a container system, micro services system, and a VRAN control/management system.

The VNF system may include components defined by ETSI, such as the illustrated NFVO 410 component in communication with local virtualized 440 components, which may include a VNFM 470, VNF 472, and/or VIM 440 component. For example, the access CPE device 404 may use the VNFM 474 to manage the life cycle of the installed VNFs 472. VNF Life cycle management may include a query to the VIM 474 to ensure physical resources (memory, CPU & I/O) are available to support a new VNF 472, instantiation of a VNF 472, VNF health monitoring and VNF restart or removal. The cloud network based NFVO 410 component may orchestrate the number and types of VNFs 472 by communicating with the VNFM 470.

The container system may include a remote container manager 412 (e.g., swarm, K8, Nomad, Mesos) in communication with a local container manager 442, which may include or communicate with various different types of containers, such as Docker 476, LXC 478 and RCKT 480. Similar to the VNFs 472 discussed above, a container may be installed on the access CPE device 404 to house a virtual function, but is managed by the cloud network 402. Container life cycle management systems such as Swarm, Kubernetes, Nomad and others may perform similar functions as the ETSI management and orchestration (MANO) in the VNF system.

The micro services system may include a remote microservice manager 414 (e.g., vSphere, AWS Lamda, Azure, OpenSync, etc.) and a local microservice manager 444, which may include any or all of a VMware VM 482 component and micro service 484 component. Generally, a Micro service is a small application that is loosely coupled with other services, independently deployable and easily testable. A micro service may be housed in a VNF, container or other constructs such as a virtual machine (i.e. VMware) or a Linux User space component as often used in OpenWrt. Micro services can have APIs or other cloud-based methods to control life cycle such as vSphere (VMware), AWS Lamda, Microsoft Azure, Plume's OpenSync and others.

The NFVO 410 component, remote container manager 412, or the remote microservice manager 414 may offload one or more functions to the respective local manager 440, 442, 444 so that the operations may be performed on the access CPE device 404 at the edge of the network. Similarly, the vRAN control/management system may include the vRAN control/management 415 component configured to offload one or more functions to be performed on the access CPE device 404 at the edge of the network.

Some embodiments may include a hybrid access CPE device (e.g., CPE device 162, 404 etc.) that is configured to implement, support or accommodate any or all of the virtualization methods or techniques (e.g., VNFs, containers, micro services) discussed in this application. In some embodiments, the hybrid access CPE device may be configured to use multiple virtualization methods/techniques. One example of using multiple virtualization methods could be moving the access and mobility management function (AMF) from the cloud-based 5G core network control platform into the CPE gateway software stack. The ciphering and integrity functions within the AMF may be placed in a VNF or in a container because they may change over time whereas the UE session and information services are more stable, and thus better suited as a micro-service. In addition, it typically takes more time to plan and develop a micro-service than a VNF/container because of tighter integration of a micro-service with the operating system (OS).

Figure 5A:
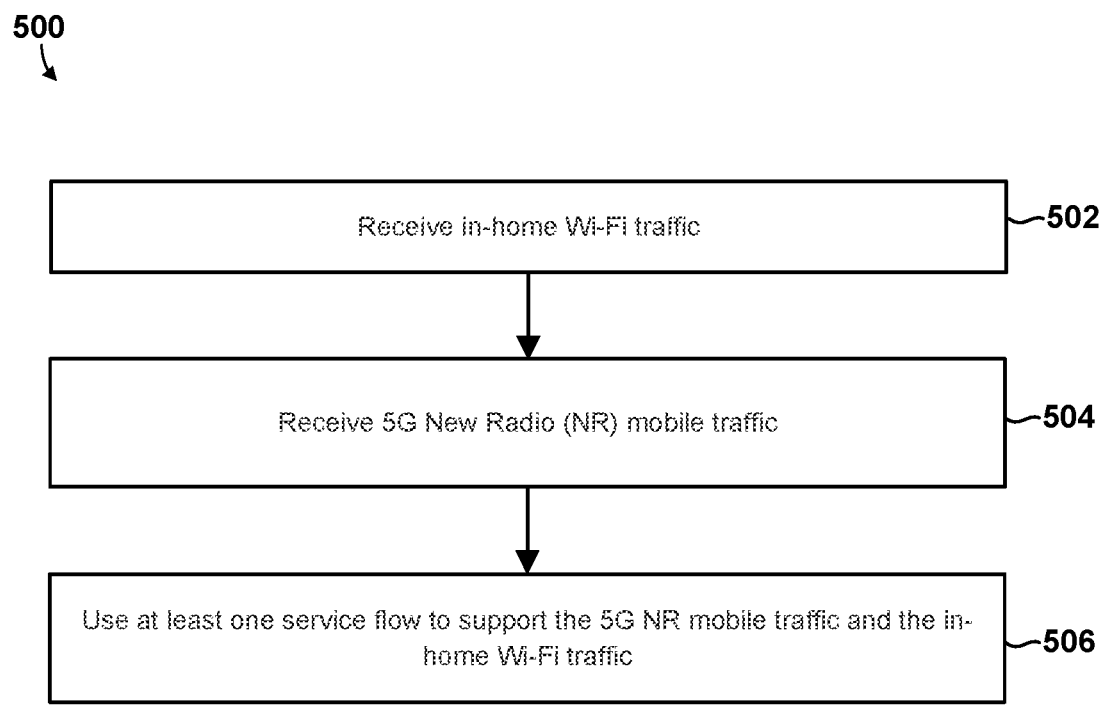
FIG. 5A is a process flow diagram illustrating a method of operating a hybrid access CPE device in accordance with an embodiment of the present disclosure.

FIG. 5A illustrates a method 500 of operating a hybrid access CPE device in accordance with various embodiments. Method 500 may be performed by one or more processors of a computing system (e.g., CPE device 140, 162, 200, 270, 404, etc.) that includes an agile software stack with 5G vRAN functionality to support 5G edge computing services and an OpenSync™ layer for command and control and telemetry via the service provider's cloud network.

In block 502, the hybrid access CPE device may receive in-home Wi-Fi traffic. In block 504, the hybrid access CPE device may also receive 5G New Radio (NR) mobile traffic.

In block 506, the hybrid access CPE device may use at least one service flow to support both the 5G NR mobile traffic and the in-home Wi-Fi traffic. For example, in block 506, the hybrid access CPE device may perform traffic bonding of both 5G traffic and home network's Wi-Fi traffic to a single service flow. By using a single service flow, the UE device may offload 5G traffic to Wi-Fi. For example, a UE device may commence consuming real-time services outside the range of the home network via its 5G NR components (e.g., 5G Modem Processor, etc.). When the UE device is within range of the home network, the UE device may join the Wi-Fi home network and offload any 5G NR traffic to the in-home Wi-Fi network. In this example, the hybrid access CPE device may use a single service flow to support both the 5G NR mobile traffic and the in-home Wi-Fi traffic. The use of a single common service flow may conserve the consumption of service flows, which may be beneficial to Multiple System Operators (MSOs).

In some embodiments, the access CPE gateway may operate in a bridge mode with two service flows, one for the 5G traffic connectivity to the core network and another for user home network traffic to the cloud network (e.g., OpenSync® cloud system, etc.).

Figure 5B:
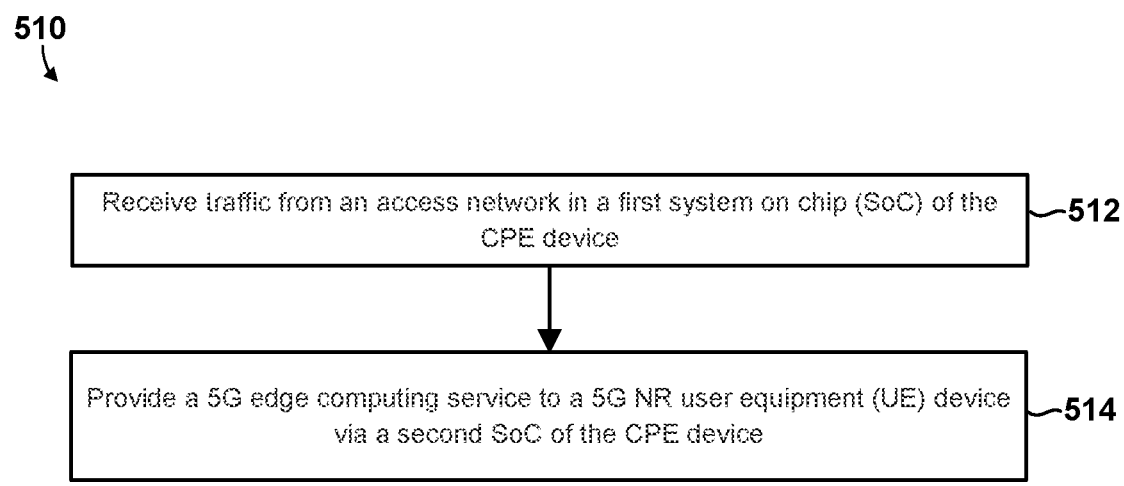
FIG. 5B is a process flow diagram illustrating a method of operating a hybrid access CPE device in accordance with another embodiment of the present disclosure.

FIG. 5B illustrates a method 510 of operating a hybrid access CPE device in accordance with various embodiments. Method 510 may be performed by one or more processors of a computing device/system (e.g., CPE device 140, 162, 200, 270, 404, etc.) that includes software stack with 5G vRAN functionality to support 5G edge computing services and an OpenSync layer for command and control and telemetry via the service provider's cloud network.

In block 512, the hybrid access CPE device may receive traffic from an access network in a first SoC (e.g., SoC 272 illustrated in FIG. 2B).

In block 514, the hybrid access CPE device may provide a 5G edge computing service to a 5G NR UE device via a second SoC of the CPE device. In some embodiments, the first SoC may include a VIPER processor/processor and the second SoC may include a ARMv7 CPU/processor.

Figure 6A:
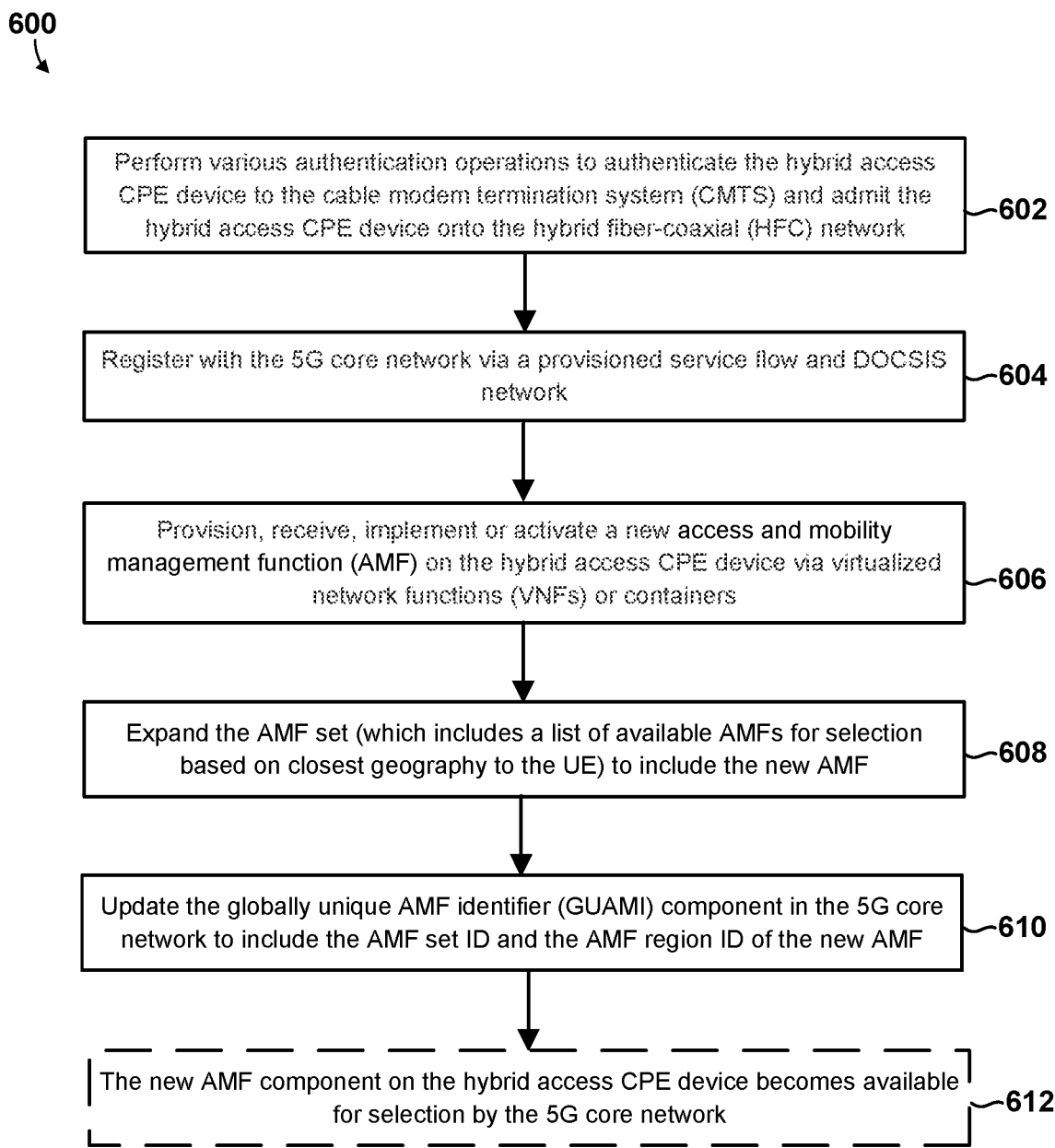
FIGS. 6A and 6B are process flow diagrams that illustrate a method of adding a 5G Core AMF to the hybrid access CPE device to offload data traffic and processing demands from the AMFs in the 5G core network in order to decrease UE latency and to enhance the experience for latency-sensitive situations.
Figure 6B:
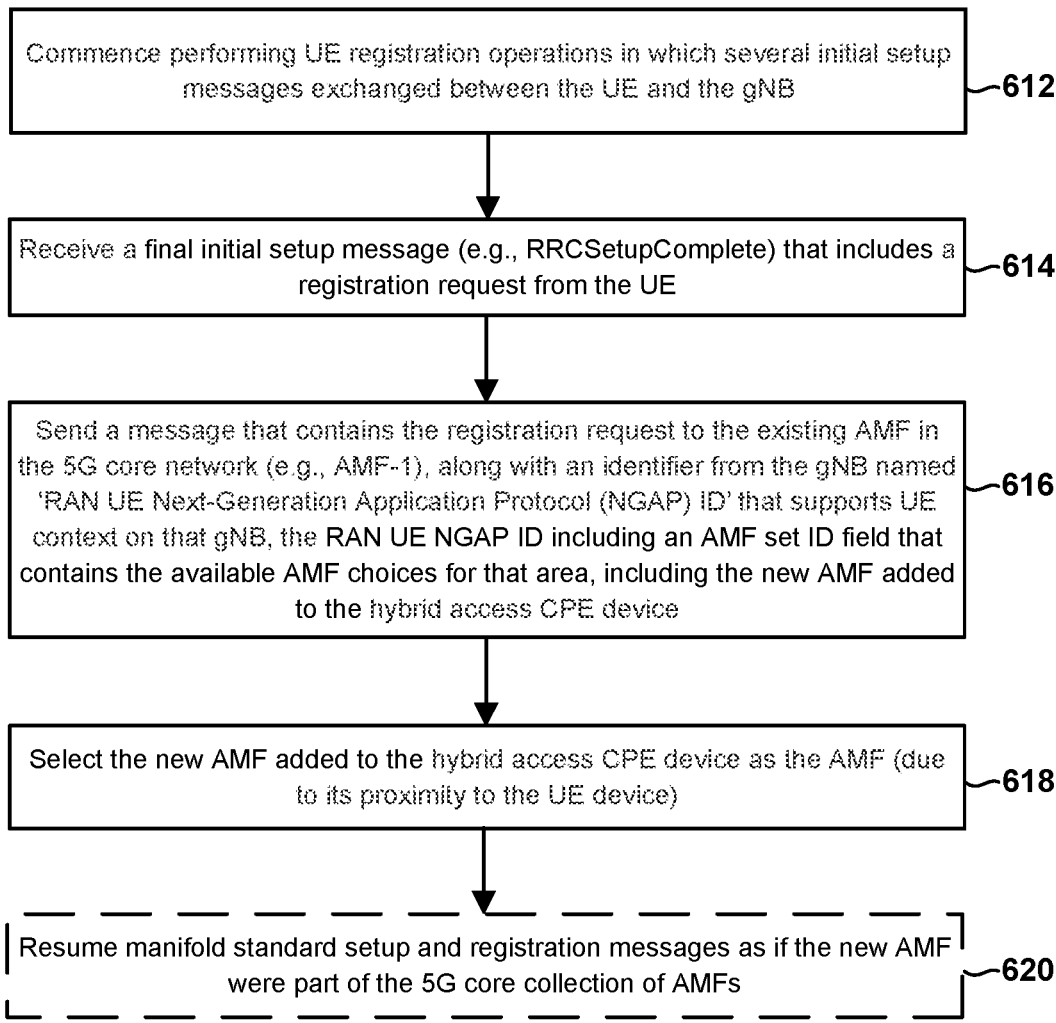

FIGS. 6A and 6B illustrate a method 600 for adding a 5G core network's AMF (AMF-7) to the hybrid access CPE device to offload data traffic and processing demands from the AMFs in the 5G core network and to decrease the UE latency, and to enhance the user experience for latency-sensitive situations. Note that method 600 focuses on UE access and not the mobility components because we assume the UE remains at or near the hybrid Access CPE device, although mobility functions would certainly be supported with such an implementation as described.

With reference to FIG. 6A, in block 602, the hybrid access CPE device may perform various authentication operations to be authenticated by a CMTS and admitted onto a HFC network. In block 604, the hybrid access CPE device may register with the 5G core network via a provisioned service flow and DOCSIS network. In blocks 606, 608 and 610, the hybrid access CPE device, a multiple-system operator (MSO), a telco provider and/or a component in the network may perform various operations to integrate a new AMF (e.g., AMF-7, etc.) into VNFs or containers of the hybrid access CPE device, update the relevant AMF set to include the new AMF, and update a GUAMI component in the 5G core network to include the AMF set ID and the AMF region ID of the new AMF. An "AMF set" may be an information unit used by 5G NR networks that includes a list of available AMFs for selection based on closest geography to the UE. After the GUAMI component is updated in block 610, the new AMF component on the hybrid access CPE device becomes available in block 612 for selection by the 5G core network.

With reference to FIG. 6B, in block 612, a UE and a gNB may commence to perform various UE registration operations in which several initial setup messages are exchanged between the UE and the gNB. In block 614, the gNB may receive a final initial setup message (e.g., RRCSetupComplete) from the UE that includes a registration request. In block 616, the gNB may send a message that contains the registration request and a RAN UE NGAP ID to the existing AMF in the 5G core network. The RAN UE NGAP ID may include an AMF set ID field that contains the available AMF choices for that area, including the new AMF added to the hybrid access CPE device. In block 618, due to its proximity to the UE device, the 5G core network (or a network component included as part of the 5G core network) may select the new AMF added to the hybrid access CPE device as its AMF. In block 620, the UE, gNB and/or the other network components may resume manifold standard setup and registration messages as if the new AMF were part of the 5G core network collection of AMFs.

In the various embodiments, some of the key operations to enable virtualized services may include authenticating hybrid access CPE device by the CMTS, admitting the hybrid access CPE device onto the HFC network, registering the hybrid access CPE device with 5G core network via the provisioned service flow via the DOCSIS network, the 5G vRAN function within the hybrid access CPE device completing its registration sequence over the NR-RAN air interface, a smart agent on the hybrid access CPE device collecting telemetry data from the hybrid access CPE device and the home network, streaming the collected telemetry data via the OpenSync™ layer on the hybrid access CPE device to the service operator's streaming and analytics platform, displaying the telemetry data on a Grafana dashboard, the hybrid access CPE device sending a request for a multi-access PDU session to the 5G core network, the 5G core network accepting the request and notifying the hybrid access CPE device that the request was accepted, the streaming and analytics platform analyzing the reported collected telemetry data using machine learning models to determine whether the hybrid access CPE device's hardware resources are available to support vRAN functionality. Other key operations include, determining whether the hybrid access CPE gateway's resources (i.e., system load, free memory, CPU utilization) are available, sends a trigger command to the virtualization management (VM) system on the operator's cloud network to enable the virtualized software components on the access hybrid access CPE device (e.g., in response to determining that the hybrid access CPE gateway's resources are available), the service operator's VM system sending configuration commands to the hybrid access CPE device to provision its virtualized software components, the CMTS activating the reserved resources for the service flows, the CMTS completing the updating the DOCSIS service flows as needed, establishing multi-access traffic paths for use by the hybrid access CPE device, splitting downstream traffic at the service operator's cloud network, and providing access to the hybrid CPE device over the NR-RAN and the HFC networks.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment. For example, one or more of the operations of the methods 500, 510, and 600 may be substituted for or combined with one or more operations of the methods 500, 510, and 600, and vice versa.

Figure 7:
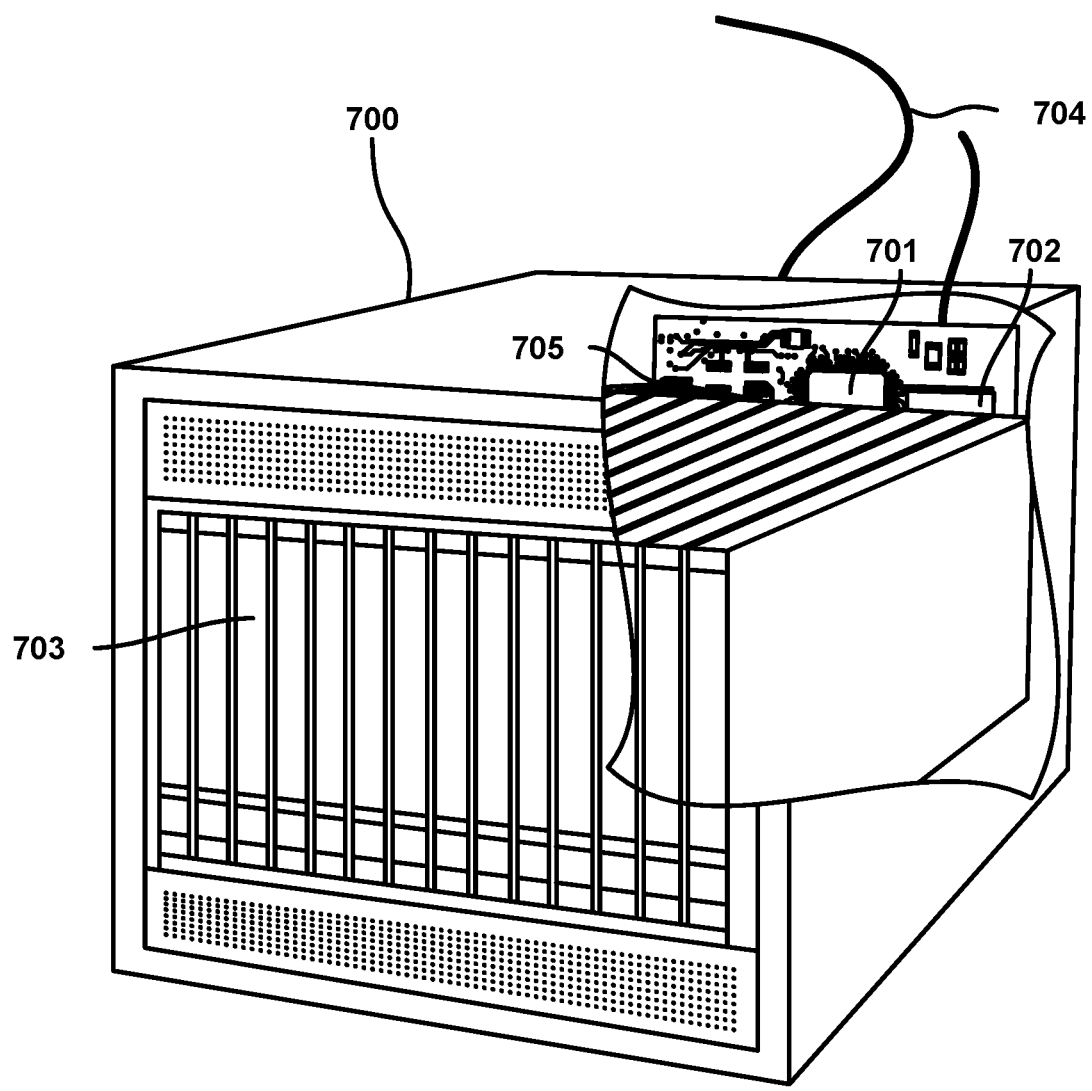
FIG. 7 is a component diagram of an example computing system suitable for implementing the various embodiments.

Various embodiments (including, but not limited to, embodiments discussed above with reference to FIGS. 1A-6B) may be implemented on any of a variety of commercially available computing devices, such as the computing device 700 illustrated in FIG. 7. Such a computing device 700 may include a processor 701 coupled to volatile memory 702 and a large capacity nonvolatile memory, such as a disk drive 703. The computing device 700 may also include network access ports 706 coupled to the processor 701 for establishing data connections with a network connection circuit 704 and a communication network (e.g., IP network) coupled to other communication system network elements.

The processors discussed in this application may be any programmable microprocessor, microcomputer or multiple processor chip or chips that can be configured by software instructions (applications) to perform a variety of functions, including the functions of the various embodiments described above. In some devices, multiple processors may be provided, such as one processor dedicated to wireless communication functions and one processor dedicated to running other applications. Typically, software applications may be stored in the internal memory before they are accessed and loaded into the processors. The processors may include internal memory sufficient to store the application software instructions. In many devices, the internal memory may be a volatile or nonvolatile memory, such as flash memory, or a mixture of both. For the purposes of this description, a general reference to memory refers to memory accessible by the processors including internal memory or removable memory plugged into the device and memory within the processors themselves. Additionally, as used herein, any reference to a memory may be a reference to a memory storage and the terms may be used interchangeable.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, components, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary embodiments, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module and/or processor-executable instructions, which may reside on a non-transitory computer-readable or non-transitory processor-readable storage medium. Non-transitory server-readable, computer-readable or processor-readable storage media may be any storage media that may be accessed by a computer or a processor. By way of example but not limitation, such non-transitory server-readable, computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, DVD, floppy disk, and Blu-ray disc where disks usually reproduce data magnetically, while discs reproduce data optically with lasers. Combinations of the above are also included within the scope of non-transitory server-readable, computer-readable and processor-readable media. Additionally, the operations of a method or algorithm may reside as one or any combination or set of codes and/or instructions on a non-transitory server-readable, processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method of operating a hybrid access customer premise equipment (CPE) device, comprising:
    operating, by a processor of the hybrid access CPE device, an access and mobility management function (AMF) that includes ciphering and integrity functions, wherein the ciphering and integrity functions of the AMF are included in a container or virtual network function (VNF) of the hybrid access CPE device;
    receiving, by the processor of the hybrid access CPE device, in-home Wi-Fi traffic;
    receiving, by the processor of the hybrid access CPE device, 5G New Radio (NR) mobile traffic; and
    bonding, by the processor of the hybrid access CPE device, the 5G NR mobile traffic and the in-home Wi-Fi traffic to a single service flow on a hybrid fiber-coaxial (HFC) network, wherein:
        a right to use the single service flow is granted to the hybrid access CPE device by a cable modem termination system (CMTS); and
        a limited number of service flows are available to the CMTS.

2. The method of claim 1, further comprising using a software stack with 5G virtualized Radio Access Network (RAN) functionality to support 5G edge computing services.

3. The method of claim 1, further comprising using an OpenSync™ layer for command and control and telemetry via the service provider's cloud network.

4. The method of claim 1, further comprising:
    establishing a first connection between the hybrid access CPE device and an access point component; and
    establishing a second connection between the hybrid access CPE device and a NR Access Network (NR-RAN) component,
    wherein receiving the 5G New Radio mobile traffic comprises receiving the 5G NR mobile traffic via the first connection.

5. The method of claim 4, wherein establishing the second connection between the hybrid access CPE device and the NR-RAN component comprises establishing an over-the-air connection between the hybrid access CPE device and the NR-RAN component.

6. The method of claim 1, further comprising using the single service flow to offload the 5G NR mobile traffic to an in-home Wi-Fi network.

7. The method of claim 1, further comprising performing at least one or more of radio resource management mobility management, call control, session management, or identity management operations on the hybrid access CPE device.

8. The method of claim 1, further comprising using one or more of the virtualized network function, the container, or a micro service to offload real time services from a component in a 5G core network to the hybrid access CPE device.

9. The method of claim 1, further comprising:
    receiving traffic from an access network in a first system on chip (SoC) of the hybrid access CPE device; and
    providing a 5G edge computing service to a 5G NR user equipment (UE) device via a second SoC of the hybrid access CPE device.

10. The method of claim 9, wherein:
    receiving the traffic from the access network in the first SoC of the hybrid access CPE device comprises receiving the traffic from the access network in a lightweight processor of the hybrid access CPE device; and
    providing the 5G edge computing service to the 5G NR UE device via the second SoC of the hybrid access CPE device comprises providing the 5G edge computing service to the 5G NR UE device via a robust processor of the hybrid access CPE device.

11. A hybrid access customer premise equipment (CPE) device, comprising:
    a processor configured with processor-executable instructions to:
        operate an access and mobility management function (AMF) that includes ciphering and integrity functions, wherein the ciphering and integrity functions of the AMF are included in a container or virtual network function (VNF) of the hybrid access CPE device;
        receive in-home Wi-Fi traffic;

receive/transmit 5G New Radio (NR) mobile traffic; and bonding the 5G NR mobile traffic and the in-home Wi-Fi traffic to a single service flow on a hybrid fiber-coaxial (HFC) network, wherein:
- a right to use the single service flow is granted to the CPE by a cable modem termination system (CMTS); and
- a limited number of service flows are available to the CMTS.

12. The hybrid access CPE device of claim 11, wherein the processor is configured to use a software stack with 5G virtualized Radio Access Network (RAN) functionality to support 5G edge computing services.

13. The hybrid access CPE device of claim 11, wherein the processor is configured to use an OpenSync™ layer for command and control and telemetry via the service provider's cloud network.

14. The hybrid access CPE device of claim 11, wherein the processor is configured to:
- establish a first connection between the hybrid access CPE device and an access point component;
- establish a second connection between the hybrid access CPE device and a NR Access Network (NR-RAN) component; and
- receive the 5G New Radio mobile traffic via the first connection.

15. The hybrid access CPE device of claim 14, wherein the processor is configured to establish the second connection between the hybrid access CPE device and the NR-RAN component by establishing an over-the-air connection between the hybrid access CPE device and the NR-RAN component.

16. The hybrid access CPE device of claim 11, wherein the processor is further configured to use the single service flow to offload the 5G NR mobile traffic to an in-home Wi-Fi network.

17. The hybrid access CPE device of claim 11, wherein the processor is configured to perform at least one or more of radio resource management mobility management, call control, session management, or identity management operations.

18. The hybrid access CPE device of claim 11, wherein the processor is configured to use one or more of the virtualized network function, the container, or a micro service to offload real time services from a component in a 5G core network.

19. The hybrid access CPE device of claim 11, further comprising:
- a first system on chip (SoC) configured to receive traffic from an access network; and
- a second SoC configured to provide a 5G edge computing service to a 5G NR user equipment (UE) device.

20. The hybrid access CPE device of claim 19, wherein:
the first SOC includes a lightweight processor; and
the second SOC includes an robust processor.

21. A non-transitory computer readable storage medium having stored thereon processor-executable software instructions configured to cause a processor in a hybrid access customer premise equipment (CPE) device to perform operations comprising:
- operating an access and mobility management function (AMF) that includes ciphering and integrity functions, wherein the ciphering and integrity functions of the AMF are included in a container or virtual network function (VNF) of the hybrid access CPE device;
- receiving in-home Wi-Fi traffic;
- receiving 5G New Radio (NR) mobile traffic; and
- bonding the 5G NR mobile traffic and the in-home Wi-Fi traffic to a single service flow on a hybrid fiber-coaxial (HFC) network, wherein:
  - a right to use the single service flow is granted to the CPE by a cable modem termination system (CMTS); and
  - a limited number of service flows are available to the CMTS.

22. The non-transitory computer readable storage medium of claim 21, wherein the stored processor-executable software instructions are configured to cause the processor of the hybrid access CPE device to perform operations further comprising using a software stack with 5G virtualized Radio Access Network (RAN) functionality to support 5G edge computing services.

23. The non-transitory computer readable storage medium of claim 21, wherein the stored processor-executable software instructions are configured to cause the processor of the hybrid access CPE device to perform operations further comprising using an OpenSync™ layer for command and control and telemetry via the service provider's cloud network.

24. The non-transitory computer readable storage medium of claim 21, wherein the stored processor-executable software instructions are configured to cause the processor of the hybrid access CPE device to perform operations further comprising:
- establishing a first connection between a customer premise equipment (CPE) device and an access point component; and
- establishing a second connection between the hybrid access CPE device and a NR Access Network (NR-RAN) component,
- wherein receiving the 5G New Radio mobile traffic comprises receiving the 5G NR mobile traffic via the first connection.

25. The non-transitory computer readable storage medium of claim 24, wherein the stored processor-executable software instructions are configured to cause the processor of the hybrid access CPE device to perform operations such that establishing the second connection between the hybrid access CPE device and the NR-RAN component comprises establishing an over-the-air connection between the hybrid access CPE device and the NR-RAN component.

26. The non-transitory computer readable storage medium of claim 21, wherein the stored processor-executable software instructions are configured to cause the processor of the hybrid access CPE device to perform operations further comprising using the single service flow to offload the 5G NR mobile traffic to an in-home Wi-Fi network.

27. The non-transitory computer readable storage medium of claim 21, wherein the stored processor-executable software instructions are configured to cause the processor of the hybrid access CPE device to perform operations further comprising performing at least one or more of radio resource management mobility management, call control, session management, or identity management operations on a customer premise equipment (CPE) device.

28. The non-transitory computer readable storage medium of claim 21, wherein the stored processor-executable software instructions are configured to cause the processor of the hybrid access CPE device to perform operations further comprising using one or more of the virtualized network function, the container, or a micro service to offload real time services from a component in a 5G core network to a customer premise equipment (CPE) device.

29. The non-transitory computer readable storage medium of claim 21, wherein the stored processor-executable software instructions are configured to cause the processor of the hybrid access CPE device to perform operations further comprising:
    receiving traffic from an access network in a first system on chip (SoC) of a hybrid access customer premise equipment (CPE) device; and
    providing a 5G edge computing service to a 5G NR user equipment (UE) device via a second SoC of the hybrid access CPE device.

30. The non-transitory computer readable storage medium of claim 29, wherein the stored processor-executable software instructions are configured to cause the processor of the hybrid access CPE device to perform operations such that:
    receiving the traffic from the access network in the first SoC of the hybrid access CPE device comprises receiving the traffic from the access network in a lightweight processor of the hybrid access CPE device; and
    providing the 5G edge computing service to the 5G NR UE device via the second SoC of the hybrid access CPE device comprises providing the 5G edge computing service to the 5G NR UE device via a robust processor.

\* \* \* \* \*